United States Patent
Sato et al.

(10) Patent No.: US 7,254,409 B2
(45) Date of Patent: Aug. 7, 2007

(54) MULTICAST SERVICE PROVIDING SYSTEM, MULTICAST SERVICE PROVIDING METHOD, INFORMATION DISTRIBUTOR, RADIO TERMINAL, AND RADIO BASE STATION

(75) Inventors: Hijin Sato, Yokohama (JP); Kobaruto Shimada, Yokosuka (JP); Toshiaki Takao, Yokohama (JP); Narumi Umeda, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 392 days.

(21) Appl. No.: 10/018,005

(22) PCT Filed: Apr. 12, 2001

(86) PCT No.: PCT/JP01/03163

§ 371 (c)(1),
(2), (4) Date: Mar. 25, 2002

(87) PCT Pub. No.: WO01/80590

PCT Pub. Date: Oct. 25, 2001

(65) Prior Publication Data

US 2002/0106985 A1    Aug. 8, 2002

(30) Foreign Application Priority Data

Apr. 14, 2000  (JP)  .............................. 2000-114073
Apr. 20, 2000  (JP)  .............................. 2000-119537
Nov. 30, 2000  (JP)  .............................. 2000-366015

(51) Int. Cl.
    *H04Q 7/20* (2006.01)
(52) U.S. Cl. .................. 455/466; 455/414.1; 340/7.46; 370/335
(58) Field of Classification Search .. 455/414.1–414.4, 455/403, 422.1, 466, 463; 370/335; 340/7.46
See application file for complete search history.

(56) References Cited

U.S. PATENT DOCUMENTS 5,481,254 A  *  1/1996  Gaskill et al. ......... 340/7.46 X
5,887,252 A  *  3/1999  Noneman ................. 455/463
6,104,709 A  *  8/2000  Rinchiuso et al. .......... 370/335
6,477,149 B1 * 11/2002  Okanoue ............. 455/414.1 X
6,542,755 B1    4/2003  Tsukagoshi
6,681,114 B2 *  1/2004  Chang et al. ........ 455/414.2 X

FOREIGN PATENT DOCUMENTS

EP       0 951 198 A2     10/1999

(Continued)

*Primary Examiner*—Philip J. Sobutka
(74) *Attorney, Agent, or Firm*—Oblon, Spivak, McClelland, Maier & Neustadt, P.C.

(57) ABSTRACT

The present invention is configured such that, in a multicast service providing system in which multicast information distribution service is made from an information distributing apparatus to radio terminals present within a service area via a radio section, the radio terminal has service continuation request signal transmitting a service continuation request signal for requesting continuation of the multicast information distribution service to the information distributing apparatus, the information distributing apparatus has service continuation management means managing as to whether or not request for the service continuation has been made by the radio terminal for the multicast information distribution service, and the information distributing apparatus transmits information indicating as to whether or not continuation request has been made for the multicast information distribution service managed by the service continuation management means.

58 Claims, 26 Drawing Sheets

FOREIGN PATENT DOCUMENTS

| | | |
|---|---|---|
| JP | 9-9330 | 1/1997 |
| JP | 10-150460 | 6/1998 |
| JP | 10-164650 | 6/1998 |
| JP | 11-32370 | 2/1999 |
| JP | 2000-32007 | 1/2000 |
| JP | 3022530 | 1/2000 |
| JP | 2000-175263 | 6/2000 |
| JP | 2000-217157 | 8/2000 |
| JP | 2000-244889 | 9/2000 |
| JP | 2000-250875 | 9/2000 |

* cited by examiner

FIG.7

| ITEM | TYPE | VALUE |
|---|---|---|
| RESET STATE | RESET STATE | ON/OFF |
| FLAG FOR DISTRIBUTION SERVICE | #1 | ON/OFF |
| | #2 | ON/OFF |
| | #3 | ON/OFF |
| | #4 | ON/OFF |

FIG.13

| MULTICAST GROUP ADDRESS | TRANSMISSION CHANNEL | INFORMATION CHANNEL NUMBER |
|---|---|---|
| 239.111.102.45 | #1 | 1 |
| 226.208.121.23 | #2 | 2 |
| 231.131.172.10 | #3 | 3 |
| . . . | . . . | . . . |
| . . . | . . . | . . . |

FIG.18

| MULTICAST GROUP ADDRESS | TRANSMISSION CHANNEL | INFORMATION CHANNEL NUMBER | SERVICE CONTINUE CHECK SIGNAL |
|---|---|---|---|
| 239.111.102.45 | #1 | 1 | 1(=TRANSMISSION) |
| 226.208.121.23 | #2 | 2 | 0(=UN-TRANSMISSION) |
| 231.131.172.10 | #3 | 3 | 0(=UN-TRANSMISSION) |
| ... | ... | ... | ... |
| ... | ... | ... | ... |

FIG.22
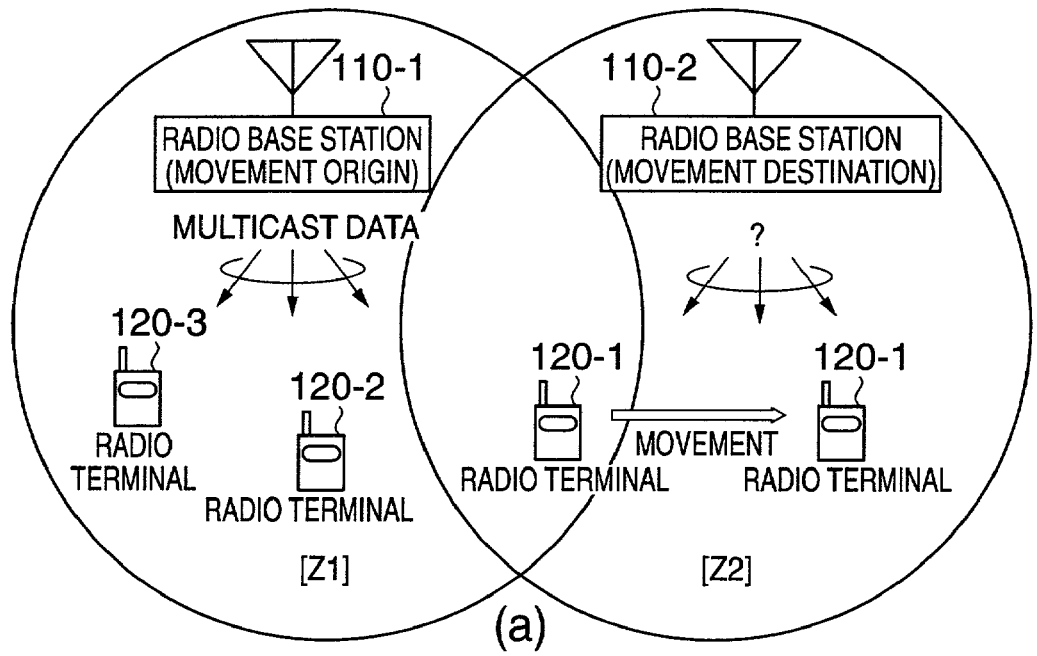
(a)
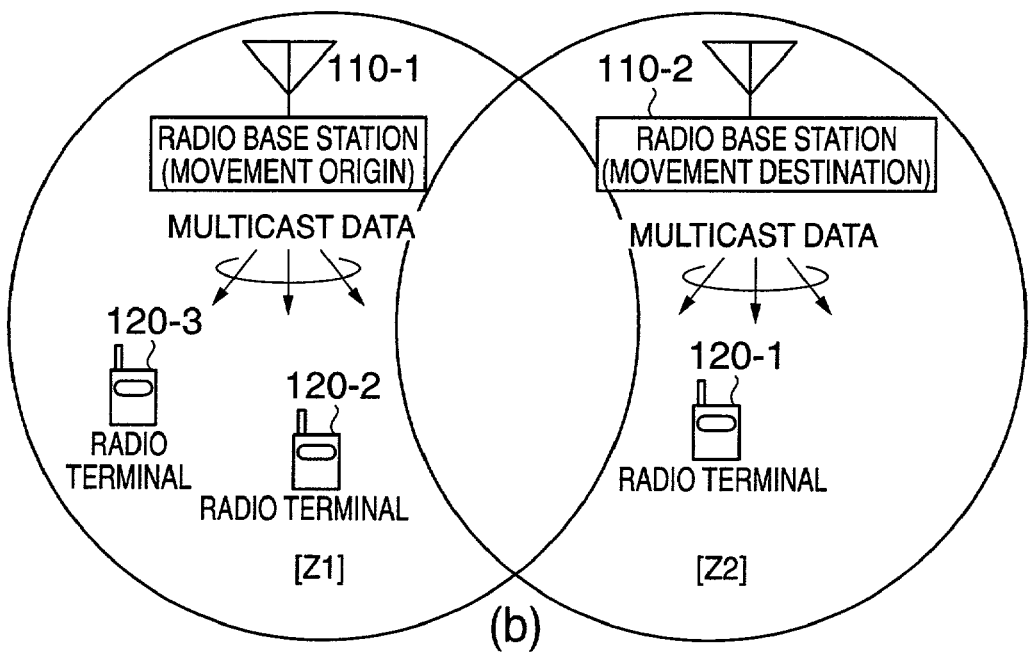
(b)

FIG.24
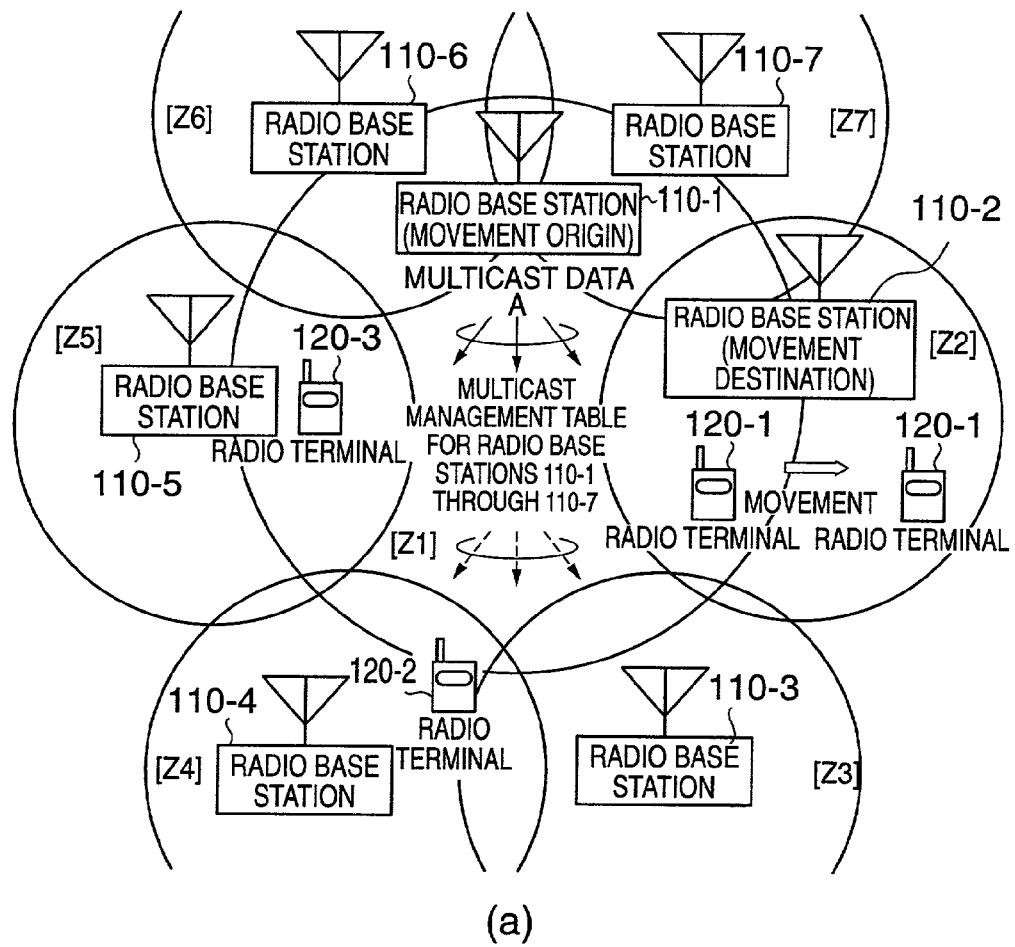
(a)
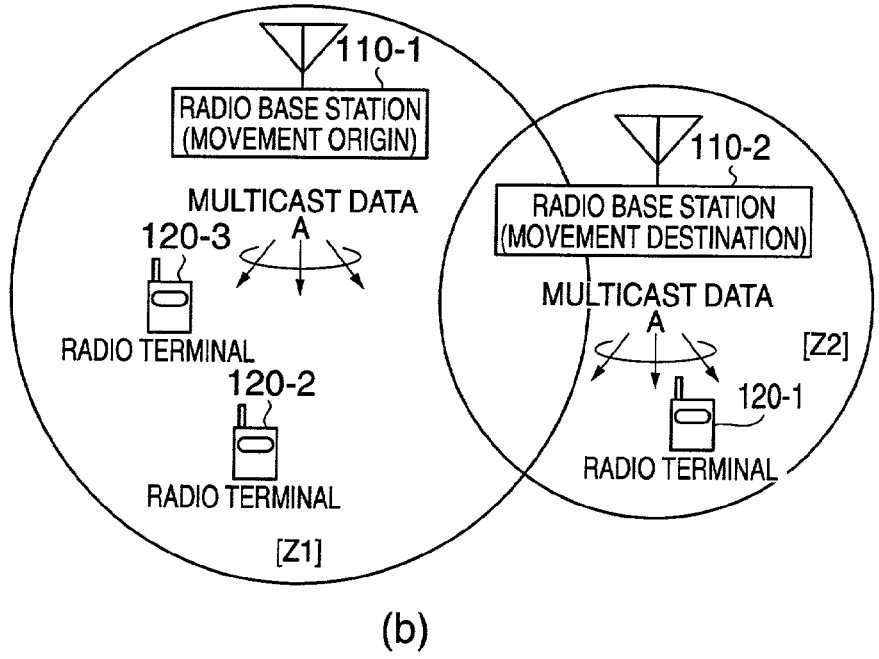
(b)

FIG.25

| RADIO BASE STATION NUMBER | PROGRAM TITLE | RADIO CHANNEL NUMBER | DISTRIBUTION CHECK 1 | DISTRIBUTION CHECK 2 |
|---|---|---|---|---|
| 1 | 224.0.100.51 | 5 | 0 | 1 |
| | 231.21.78.93 | 13 | 0 | |
| | 228.250.141.4 | 8 | 0 | |
| 2 | 229.31.7.85 | 9 | 1 | 0 |
| ... | ... | ... | ... | ... |
| 6 | 226.86.25.2 | 7 | 0 | 0 |
| 7 | 230.49.135.107 | 2 | 0 | 0 |
| | 239.200.3.246 | 4 | 0 | |

MULTICAST SERVICE PROVIDING SYSTEM, MULTICAST SERVICE PROVIDING METHOD, INFORMATION DISTRIBUTOR, RADIO TERMINAL, AND RADIO BASE STATION

TECHNICAL FIELD

The present invention relates to a multicast service providing method and system, and, in particular, a multicast service providing method and system by which, to radio terminals present in a service area, multicast information (multicast data) distribution service is performed via a radio section.

Furthermore, the present invention relates to an information distributing apparatus, a radio terminal and a radio base station applied to the above-mentioned multicast service providing system.

BACKGROUND ART

An IGMP (Internet Group Management Protocol) is known as a multicast communication protocol realizable in an IP network. The IGMP is a protocol for determining whether or not a router sends out multicast information to a sub-network, for the purpose of avoiding congestion of a network. An access communication system connected to the network which supports the IGMP should employ a control procedure which has an affinity with the IGMP.

In a communication system according to the IGMP, while the router distributes (broadcasts) multicast information to each host in the sub-network, the router broadcasts query periodically. The host which received the query monitors as to whether a response from another host is received within a random time. When a response from another host is received by the host, this host maintains a reception condition for multicast information. However, no response from another host is received by the host, this host transmits a response (report) to the router and the other host so as to continue reception of multicast information. Then, when the router receives a response (report) from any host in response to the periodically broadcast query, the router continues distribution (broadcast) of the multicast information to each host.

Such a processing procedure may be applied to a radio section as it is. In this case, as shown in FIG. 1, a message corresponding to the above-mentioned query is transmitted to all the radio terminals present in a service area by a radio base station. The radio terminal which has received the message transmits a request for the service continuation as a response thereto to the radio base station after a random time has elapsed, when desiring continuation of multicast information distribution service. When receiving a response to the above-mentioned query from any radio terminal, the radio base station continues the multicast information distribution service.

Thus, in case the processing procedure of IGMP is applied to the radio section, when receiving the message corresponding to the query from the radio base station, the radio terminal can transmit a response thereto to the radio base station. However, it is not possible to transmit another radio terminal in case of IP network. If the above-mentioned response transmitted from the radio terminal could not be received by all the other radio terminals which receive multicast information in the same service area, the response would be returned to the radio base station from all the radio terminals which desire continuation of receiving the multicast information. Thereby, congestion is likely to occur in the radio section.

Further, an access to a channel transmitting the above-mentioned request for service continuation occurs randomly from a plurality of radio terminals. However, in case the permissible number of the accesses is limited for this channel, collision occurs when many radio terminals simultaneously transmit the requests for service continuation by chance. Thereby, as shown in FIG. 1, the request for service continuation does not reach the radio base station (see a sign x). When the radio base station operates in accordance with a protocol such as IGMP, the radio station terminates multicast information distribution service after a predetermined time has elapsed without transmission of a request for service continuation made from any radio terminal after transmitting the query. Thereby, the service would be interrupted even though there are the radio terminals which request service of distributing multicast information in the service area if the request for service continuation made from the many radio terminals simultaneously by chance collided as mentioned above.

Further, recently, verification for a multicast application performing broadcast-like distribution of music or movies via the Internet employing a cable network, or performing cooperative works or remote meeting by a plurality of users has been performed by using IGMP performing group management of various multicast service.

On the other hand, through spread of portable telephone terminals such as cellular phones, PHS terminals, or the like, or portable information terminals such as so-called notebook personal computers, it is expected that a demand of radio provision of multicast service increases. When an PC terminal of an end user of a network and a router of a sub-network in which this PC terminal exists can operate in accordance with IGMP, provision of multicast service can be made whether the channel is of cable or radio.

Therefore, a system such as that shown in FIG. 2 can be assumed as a system performing the above-mentioned provision of multicast service, for example. This example employs a radio base station 220 which can operate in accordance with IGPM which acts as an access point for a radio LAN. In this case, multicast information A, B and C provided by various servers 251, 252 and 253 via an IP network NW and a router 230 is distributed from the radio base station 220.

For example, when radio terminals 210(1), 210(2) and 210(3) including radio LAN connection communication devices belonging to a service area Es (LAN) of radio LAN and PC terminals request multicast information A, B and C different from each other, the radio base station 220 broadcasts all the multicast information A, B and C thus requested. Then, each of the radio terminals 210(1), 210(2) and 210(3) receives all the multicast information A, B and C. Then, in each radio terminal (PC terminal), necessary multicast information is extracted from the thus-received information to be used.

In case the radio base station 220 distributes multicast information in the service area Es (LAN) of radio LAN, no individual radio channel is set for each radio terminal. However, a data stream including the plurality of sets of multicast information broadcast from the radio base station 220 mixed therein is received by each radio terminal (cellular phone and PC terminal), and is stored thereby, and, then, only necessary information is extracted therefrom.

Therefore, when each radio terminal receives a large amount of multicast information, a heavy burden is loaded thereon for buffering it.

Furthermore, a system such as that shown in FIG. 3 can also be assumed as a system performing the above-mentioned radio provision of multicast service, for example. This example performs multicast service by using a radio base station 220 connected to a public network NW such as an existing PDC (Personal Digital Cellular) or PHS. In this case, multicast information A provided from a server 250 via the public network NW is distributed from the radio base station 220 to respective radio terminals 210(1), 210(2) and 210(3) belonging to a service area Es thereof. In distributing the multicast information A, an individual channel is set between each of the radio terminals 210(1), 210(2) and 210(3), and the radio base station 220.

In such a system in which multicast service is performed by using the base station 220 connected to the public network NW, the individual radio channel should be set for each radio terminal even for transmitting the same multicast information within the same service area Es. Accordingly, it is not possible to effectively utilize the radio resources.

Furthermore, a system shown in FIG. 4 can also be assumed for performing the above-mentioned radio provision of multicast information, for example. This example performs multicast service in an advanced radio calling system (FLEX-TD). In this system, a radio base station 220 transmits multicast information provided from various servers 251, 252 and 253 via a public network NW by using a radio channel set for each set of multicast information regardless of whether or not radio terminals which desire the service belonging to a service area (radio zone) Es exist, in a broadcast-like manner. Each of the radio terminals 210(1), 210(2) and 210(3) can receive multicast information for which contract has been made previously. For example, the radio terminal 210(1) which made a contract for multicast information A can receive only the multicast information A from among multicast information A, B and C, the radio terminal 210(2) which made a contract for multicast information A and C can receive only the multicast information A and C, and the radio terminal 210(3) which made a contract for multicast information C can receive only the multicast information C.

However, in such a system, each radio terminal can receive only multicast information for which a contract has been made. However, even when the radio terminal which made a contract of receiving multicast information does not exist within the service area Es, the radio base station 220 should perform continues transmission of the multicast information. Thus, it is not possible to effectively utilize the radio resources.

Furthermore, when information multicast distribution service is realized in a radio communication system, in particular, in a mobile communication system, smooth switching of base station from which information is received by a mobile set is needed when the mobile set which is a radio terminal moves across service areas (in case of handoff) while receiving the multicast distribution of the information.

Thus, in case information multicast distribution service is applied to a radio communication system, various problems should be solved.

DISCLOSURE OF THE INVENTION

A general object of the present invention is to provide a new and useful multicast service providing system, method and, information distributing apparatus, radio terminal and radio base station by which the above-described problems of the prior art can be solved.

A detailed object of the present invention is to provide a multicast service providing system, method and, information distributing apparatus, radio terminal and radio base station by which radio resources can be effectively utilized, and, also, it becomes possible to properly perform multicast information distribution service via a radio section to radio terminals present within a service area.

The objects of the present invention can be attained by configuring a radio terminal to have service continuation requesting means transmitting to an information distributing apparatus a service continuation request signal for requesting continuation of multicast information distribution service, in a multicast service providing system for performing multicast information distribution service to the radio terminal present within a service area via a radio section from the information distributing apparatus, and, by configuring the information distributing apparatus to have a service continuation management means managing as to whether or not the above-mentioned request for service continuation from the radio terminal for the multicast information distribution service has been made, the information distributing apparatus transmitting information managed by the service continuation management means to the radio terminal information indicating whether or not the continuation request for the multicast information distribution service has been made.

In this multicast service providing system, the radio terminal can determine whether or not the service continuation request signal is to be transmitted thereby, based on the information indicating whether or not continuation request for the multicast information distribution service has been made transmitted from the information distributing apparatus. Then, when this information indicating whether or not continuation request for the multicast information distribution service has been made indicates a state that this continuation request has not been made, the service continuation requesting means of the radio terminal can transmit the service continuation request signal to the information distributing apparatus.

Further, the information distributing apparatus can determine whether or not the multicast information distribution service should be continued, based on the management state of the service continuation management means.

In the above-mentioned multicast information distributing system, the service management means may be configured to have management state resetting means resetting the management state into a state that no request for continuation of the multicast information distribution service has been made from the radio terminal.

In this multicast service providing system, the information distributing apparatus can positively determines whether or not the radio terminal requesting the multicast information distribution service is present within the service area. That is, when the service continuation request signal is transmitted from the radio terminal after the management state of the service management means is reset to a state that no request for continuation of the multicast information distribution service has been made, the information distributing apparatus can determine that the radio terminal which requests the multicast information distribution service is present within the service area.

Furthermore, in the above-mentioned multicast information distributing system, the above-mentioned management state resetting means may be configured to perform the resetting operation for the management state every predetermined period.

In this multicast information distributing system, the above-mentioned positive determination made by the information distribution apparatus can be made periodically.

Furthermore, in the above-mentioned multicast information distributing system, the radio terminal may have continuation request control means performing control such that, when the information indicating whether or not continuation request for the multicast information distribution service has been made transmitted from the information distribution apparatus indicates a state that the request has not been made, the service continuation requesting means transmits the service continuation request signal to the information distributing apparatus.

In this multicast service providing system, the request for multicast information distribution service continuation can be properly transmitted according to the management state of the information distributing apparatus.

Further, in the above-mentioned multicast service providing system, the above-mentioned continuation request control means may be configured to control the above-mentioned service continuation requesting means so that the above-mentioned service continuation request signal is transmitted after a first random time has elapsed since the information indicating the state that no continuation request has been made for the multicast information distribution service was received.

In this multicast service providing system, in case a plurality of radio terminals requesting continuation of the multicast information distribution service exist within the service area, it is possible to reduce a probability of collision of the service continuation request signals transmitted to the information distributing apparatus from the respective radio terminals. That is, in the case where the plurality of radio terminals requesting continuation of the multicast information distribution service exist within the service area, each radio terminal transmits the above-mentioned service continuation request signal at a random timing after receiving from the information distributing apparatus the information indicating the state that no continuation request has been made for the multicast information distribution service. Thereby, a probability that each radio terminal simultaneously transmits the service continuation request signal to the information distributing apparatus is made smaller.

Further, in the above-mentioned multicast service providing system, the radio terminal may be configured to have re-transmission control means performing a control such that the above-mentioned service continuation requesting means re-transmits the service continuation request signal to the information distributing apparatus when the information indicating as to whether or not continuation request has been made for the multicast information distribution service has not been changed into information indicating that the request has been made within a predetermined time after the service continuation requesting means transmute the service continuation request signal.

In this multicast service providing method, even when the service continuation request signal transmitted from the radio terminal has not been received by the information distributing apparatus by some reason, it is possible to prevent the multicast information distribution service from being terminated for the radio terminal.

Further, in the above-mentioned multicast service providing system, the above-mentioned re-transmission control means may be configured to control the above-mentioned service continuation requesting means so that the above-mentioned service continuation request signal may be transmitted again after a second random time has elapsed after the above-mentioned predetermined time had elapsed since the service continuation requesting means transmitted the service continuation request signal.

In this multicast service providing system, in case a plurality of radio terminals exist within the service area, it is possible to prevent the service continuation request signals re-transmitted from the respective radio terminals from colliding.

Further, in the above-mentioned multicast service providing system, a setting may be made such that a time elapsing since the above-mentioned management state resetting means reset the management state of the service request management means into a state that no request for continuation of the multicast information distribution service until the above-mentioned service continuation request means re-transmits the service continuation request signal may be shorter than a time elapsing since the above-mentioned management state was reset to a state that continuation for a service has not been made from the radio terminal for the multicast information distribution service until resetting is made subsequently.

In this multicast service providing system, it is possible to positively change the management state of the information distributing apparatus by the above-mentioned service continuation request signal re-transmitted.

Further, in the above-mentioned multicast service providing system, the above-mentioned service continuation management means may be configured to manage as to whether or not continuation request has been made for the multicast information distribution service by using a flag which is made to be ON when the service continuation request signal is received from the radio terminal.

In this multicast service providing system, it is possible to easily perform management performed by the service continuation management means in the above-mentioned information distributing apparatus.

Further, the above-mentioned object of the present invention may be attained as a result of the above-mentioned information distributing apparatus which performs multicast information distribution service to radio terminals present within a service area via a radio section having service continuation management means managing as to whether or not request for service continuation from the radio terminals for the multicast information distribution service has been made, and being configured so that information managed by the service continuation management means indicating whether or not the continuation request for the multicast information distribution service has been made may be transmitted to the radio terminals.

Further, the above-mentioned object of the present invention may be attained as a result of a radio terminal which receives multicast information distribution service from an information distributing apparatus via a radio section having service continuation requesting means transmitting a service continuation signal for requesting provision of the multicast information distribution service to the information distributing apparatus, and continuation request control means performing control such that the above-mentioned service continuation requesting means may transmit the service continuation request signal to the information distributing apparatus when information, transmitted from the information distributing apparatus managing as to whether or not a request for service continuation has been made by the radio terminal for the multicast information distribution service, indicating whether or not service continuation request has been made from the radio terminal for the multicast information distribution service indicates a state that the request has not been made.

Further, the above-mentioned object of the present invention may be attained as a result of, in a multicast service providing method by which multicast information distribution service is performed by an information distributing apparatus via a radio section on a radio terminal present in a service area thereof, the information distributing apparatus informing all the radio terminals present in the service area of information for identifying multicast information on distribution service and radio channels used for the distribution of the multicast information by using a predetermined radio channel, and the respective radio terminals within the service area receiving the multicast information distribution service from the information distributing apparatus via the thus-informed radio channels.

In this multicast service providing method, the radio terminal receives the multicast information distribution service by using the radio channel informed of by the information distributing apparatus. Accordingly, the radio channel used for the multicast information distribution service can be made to be only the radio channel informed of by the information distributing apparatus, and, also, the distribution service made via the radio channel can be made to be only of multicast information corresponding to the informed radio channel.

The above-mentioned information for identifying the multicast information informed of by the information distributing apparatus is not particularly limited as long as it can be used for identifying the multicast information provided based on this information at the radio terminal, and, may be information identifying a type of the multicast information, the channel providing it (multicast group address), information identifying a server which originally provides the information, a title of the multicast information, or the like.

Further, in the above-mentioned multicast service providing method, the information distributing apparatus may be configured to manage correspondence relationship between the information for identifying multicast information on distribution service and the radio channels used for distributing the multicast information, informs all the radio terminals present within the service area management information indicating the correspondence relationship by using the above-mentioned predetermined radio channel, and, each of the radio terminals present within the service area receives the desired multicast information distribution services by using the corresponding radio channels based on the management information.

In this multicast service providing method, it is possible to inform the radio terminals of relationship between the information for identifying a plurality of sets of multicast information on distribution service and the radio channels used for distributing the respective sets of multicast information without error.

Further, in the above-mentioned multicast service providing method, the radio terminal transmits a service request signal for requesting distribution service for multicast information not included in the above-mentioned management information, and, when receiving the above-mentioned service request signal from the radio terminal, the information distributing apparatus adds to the above-mentioned management information correspondence relationship between information for identifying the multicast information concerning this request and a radio channel used for distributing this multicast information, and, also, starts distribution service of the multicast information concerning the request by using this radio channel.

In this multicast service providing method, the radio terminal can receive distribution service of the new multicast information other than the multicast information which is currently on distribution service.

Further, the above-mentioned object of the present invention may be attained as a result of, in an information distributing apparatus which performs multicast information distribution service for radio terminals present within a service area via a radio section, a configuration being made such as to have informing control means for informing of all the radio terminals present within the service area information for identifying multicast information on distribution service and radio channels used for distributing the multicast information by using a predetermined radio channel, and, such that each of the radio terminals present within the service area can receive the multicast information distribution service via the thus-informed radio channels.

Further, the above-mentioned object of the present invention may be attained as a result of, in a radio terminal which receives multicast information distribution service via a radio section from an information distributing apparatus, a configuration being made such as to have service state reception control means receiving from the information distributing apparatus management information indicating correspondence relationship between information for identifying multicast information on distribution service and radio channels used for distributing the multicast information, such as to receive from the information distributing apparatus the desired multicast information distribution service via the corresponding radio channel based on the management information received by the service state reception control means.

Further, the above-mentioned object of the present invention may be attained as a result of, in a multicast service providing method by which multicast data is distributed to radio terminals from a radio base station, a configuration being made such that the radio terminal receiving the multicast data may transmit a distribution request for the multicast data to the radio base station on movement destination in case a necessity arises such that the other party of communication be switched from the radio base station on movement origin to the radio base station on movement destination, the radio base station on movement destination may transmit information of a radio channel used for distributing the multicast data to the above-mentioned radio terminal in response to the distribution request given from the above-mentioned radio terminal, the radio terminal may switch the radio channel based on the information of the radio channel given from the above-mentioned radio base station on movement destination so as to receive the multicast data from the radio base station on movement destination.

In this multicast service providing method, when a necessity arises such that the other party of communication be switched from the radio base station on movement origin to the radio base station on movement destination, the radio terminal should merely transmit a distribution request to the radio base station on movement destination, and, thereby, in response to the distribution request, information of the radio channel used for distributing the multicast data is transmitted from the radio base station on movement destination. Therefore, the radio terminal receives the multicast data by switching the radio channel based on this information of the radio channel. Accordingly, it is possible to switch the radio base station acting as the other party of communication, rapidly than in a case, as in the prior art, the radio terminal again receives a perch channel from the radio base station on movement destination, further receives a multicast management table based on information included in the perch channel, then, recognizes a radio channel to be used for transmission from the management table, and, thus, receives the multicast data.

Further, in the above-mentioned multicast service providing method, a configuration may be made such that the radio terminal may transmit the above-mentioned distribution request for the multicast data to the radio base station on movement origin, and the above-mentioned distribution request for the multicast data may be transmitted to the radio base station on movement destination via this radio base station on movement origin.

In this multicast service providing method, the distribution request given from the radio terminal can be made to be positively received by the radio base station on movement destination.

Further, in the above-mentioned multicast service providing method, a configuration may be made such that, in case the radio terminal cannot receive information of a radio channel to be used for distributing multicast data within a predetermined time after transmitting the distribution request, the radio terminal may transmit the distributing request again.

Also by this multicast service providing method, the distribution request given from the radio terminal can be made to be positively received by the radio base station on movement destination.

Further, in the above-mentioned multicast service providing method, a configuration may be made such that the radio terminal may transmit the distribution request several times.

Also by this multicast service providing method, the distribution request given from the radio terminal can be made to be positively received by the radio base station on movement destination.

Further, in the above-mentioned multicast service providing method, a configuration may be made such that the radio base station on movement origin may obtain information concerning multicast data distributed by an adjacent radio base station, and transmit the information concerning the multicast data, and, in case the radio terminal determines that the radio base station on movement destination does not distribute the desired multicast data based on the information concerning the multicast data thus given from the radio base station on movement origin, the radio terminal may transmit the distribution request to the radio base station on movement destination or the radio base station on movement origin so that the above-mentioned distribution request may be received by the radio base station on movement destination.

In this multicast service providing method, the multicast data which the radio base station on movement destination distributes is made to be previously recognized by the radio terminal, and, when the radio base station on movement destination distributes the desired multicast data, the multicast data can be received by the radio terminal immediately without transmission of distribution request. Accordingly, reception of the multicast data at a time of movement can be made rapidly.

Further, for example, the information concerning the multicast data includes information for identifying the multicast data on distribution, and information of radio channels by which the multicast information is distributed.

Further, the object of the present invention may be attained in a radio base station which transmits multicast data to a radio terminal, as a result of a configuration being made such as to have distribution request receiving means receiving a distribution request for multicast data transmitted from the radio terminal, and radio channel information transmitting means transmitting information of a radio channel used for distributing multicast data in response to the distributing request for the multicast data given from the radio terminal.

In this case, a configuration may be made such that the above-mentioned distribution request receiving means may receive the distribution request for the multicast data transmitted from the radio terminal via another radio base station. Further, a configuration may be made such that the above-mentioned distribution request receiving means may have information obtaining means obtaining information concerning multicast data transmitted from a radio base station adjacent to the own station, and multicast information transmitting means transmitting the information concerning the multicast information.

Further, the above-mentioned object of the present invention may be attained, as a result of, in a radio terminal which receives multicast data distributed by a radio base station, a configuration being made such as to have distribution request transmitting means transmitting a distribution request for multicast data to the radio base station on movement destination in case a necessity arises such that the other party of communication be switched from the radio base station on movement origin to the radio base station on movement destination, and multicast data reception control means switching the radio base station based on information concerning a radio channel used for distributing the multicast data transmitted from the radio base station on movement destination in response to the distribution request so as to receive the multicast data distributed from the radio base station on movement destination.

In this case, a configuration may be made such that the above-mentioned distribution request transmitting means may transmit the above-mentioned distribution request for the multicast data to the radio base station on movement origin, and, then, the above-mentioned distribution request for the multicast data may be transmitted to the radio base station on movement destination via the radio base station on movement origin. Further, a configuration may be made such that the above-mentioned distribution request transmitting means may transmit the distribution request again in case information concerning a radio channel to be used for distributing the multicast data cannot be received thereby. Further, a configuration may be made such that the above-mentioned distribution request transmitting means may transmit the distribution request several times. Further, a configuration may be made such that the above-mentioned distribution request transmitting means may transmit the distribution request to the radio base station on movement destination or the radio base station on destination origin so that the above-mentioned distribution request for the multicast data may be received by the radio base station on movement destination in case the distribution request transmitting means determines that the radio base station on movement destination does not distribute the desired multicast data based on information, received from the radio base station on movement origin, concerning multicast information distributed from the radio base station adjacent to the station.

Other objects, features, and advantages of the present invention may become apparent from the following detailed description made together with attached drawings.

BRIEF DESCRIPTION OF THE DRAWINGS

FIG. 7 is a diagram showing an example of a management table which the radio base station in the multicast service providing system has.

FIG. 13 is a diagram showing an example of a configuration of a multicast information channel table for managing multicast information channels by which service provision is made from the radio base station.

FIG. 18 is a diagram showing an example of a configuration of a multicast information channel table in case of transmitting a service continuation signal by a same channel as that for the multicast information channel table.

FIG. 22 is a conceptual diagram of operation in a first example of operation.

FIG. 24 is a conceptual diagram of operation in a second example of operation.

FIG. 25 is a diagram showing an example of a multicast management table used in the second example of operation.

BEST MODE FOR CARRYING OUT THE INVENTION

Hereafter, embodiments of the present invention will be described based on the drawings.

First, a multicast service providing system in a first embodiment of the present invention will be described.

Figure 1:
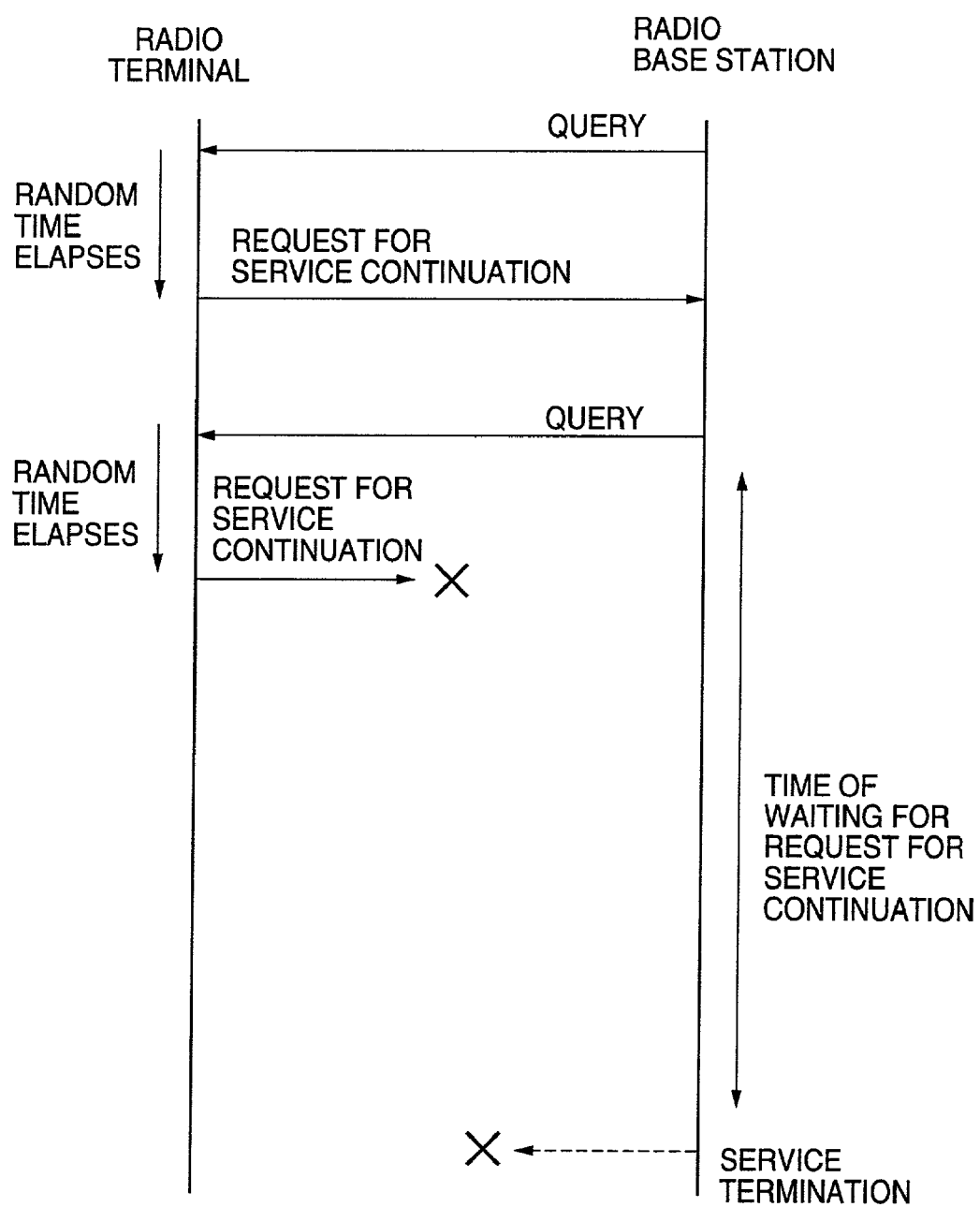
FIG. 1 is a sequence diagram showing a communication procedure between a radio base station and a radio terminal in a multicast service providing system in the prior art.
Figure 2:
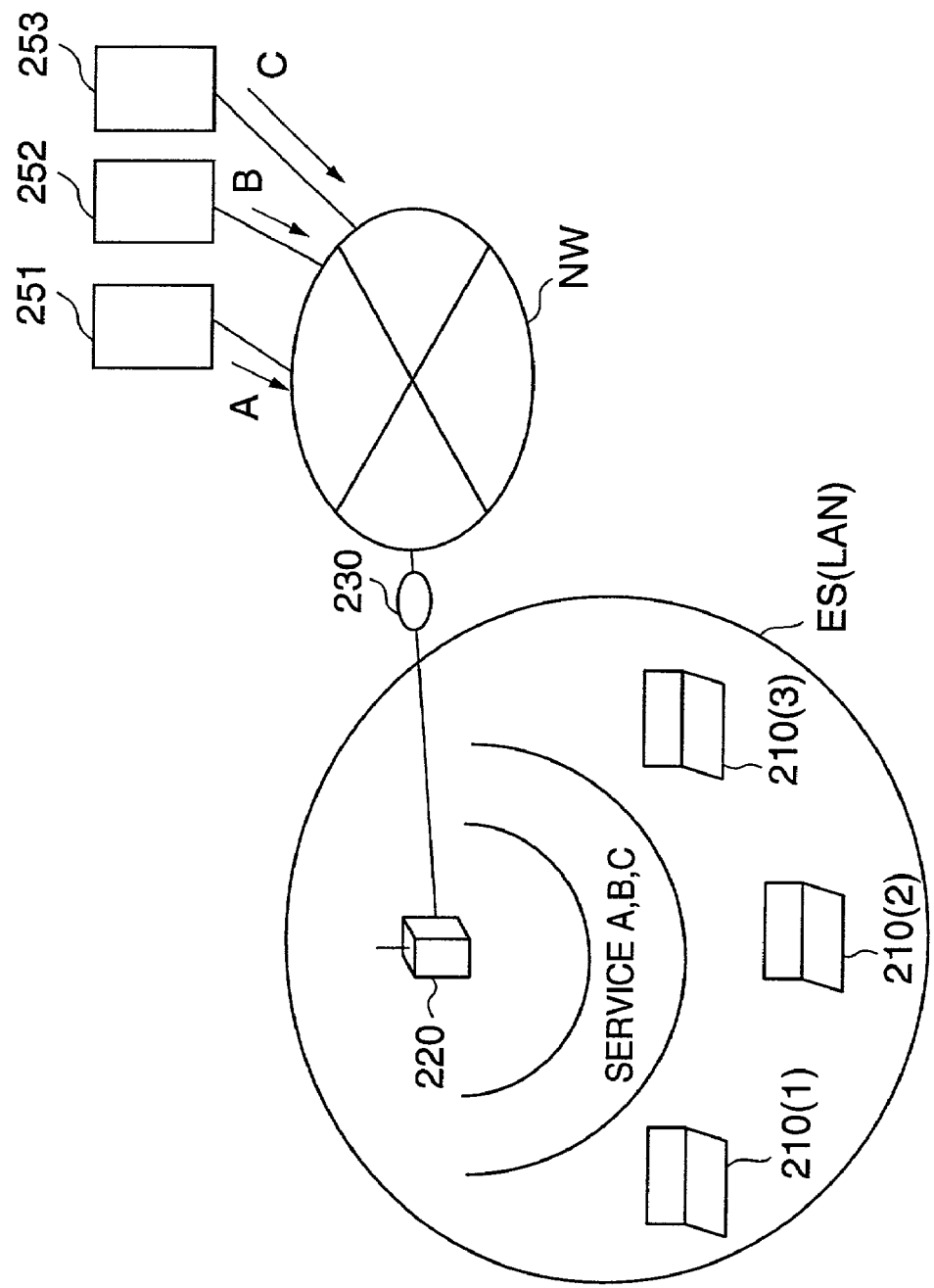
FIG. 2 is a diagram showing a first example of a multicast service providing system in the prior art applied to a radio section.
Figure 3:
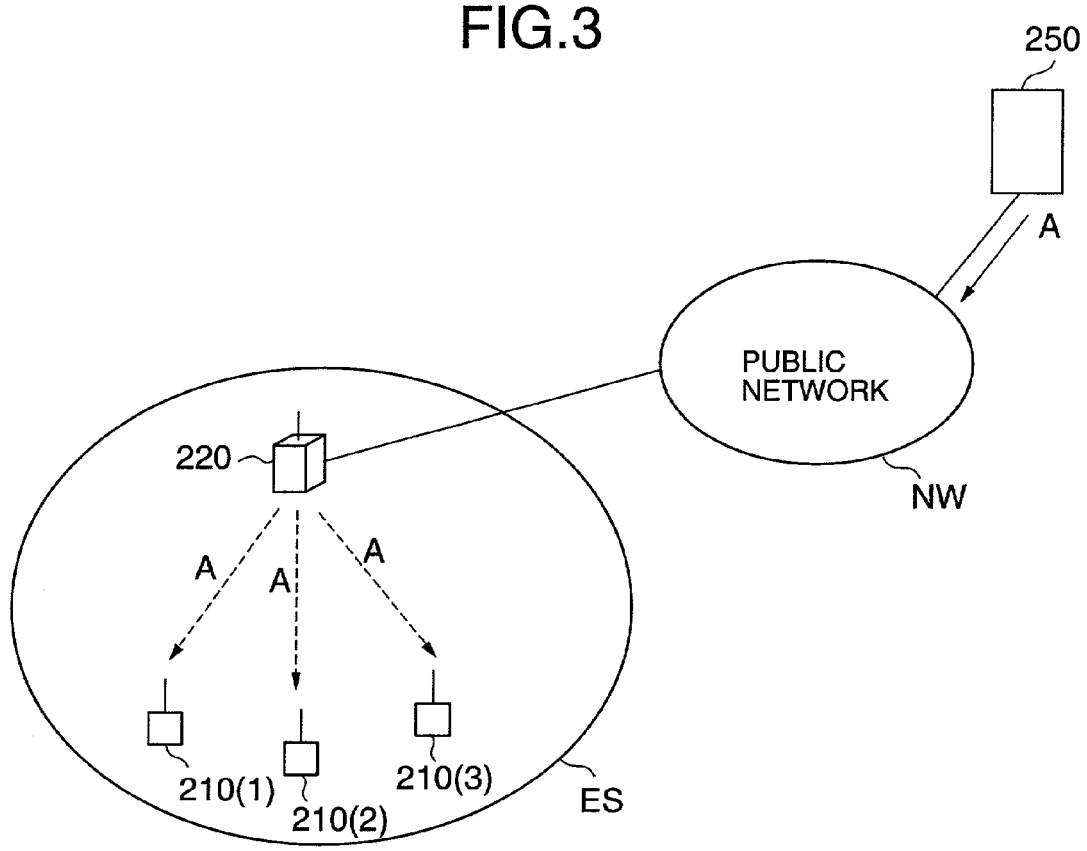
FIG. 3 is a diagram showing a second example of a multicast service providing system in the prior art applied to a radio section.
Figure 4:
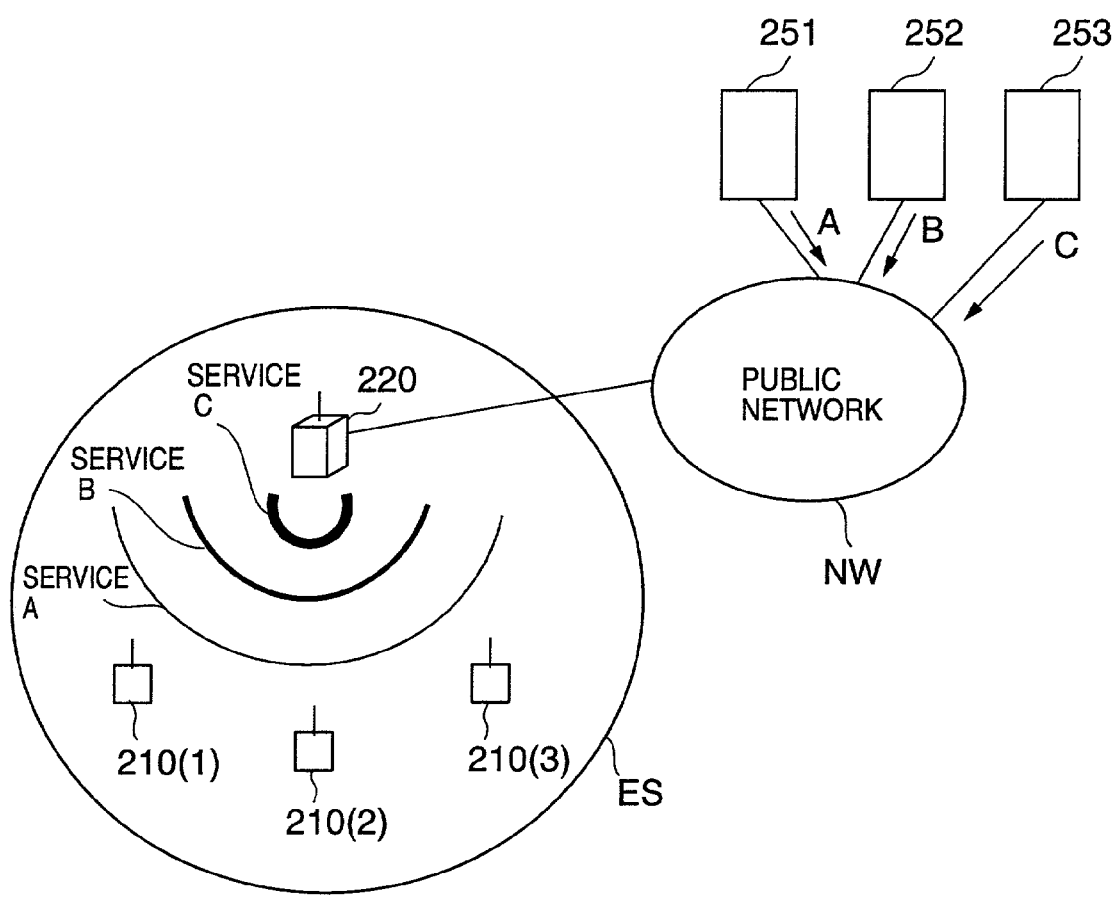
FIG. 4 is a diagram showing a third example of a multicast service providing system in the prior art applied to a radio section.
Figure 5:
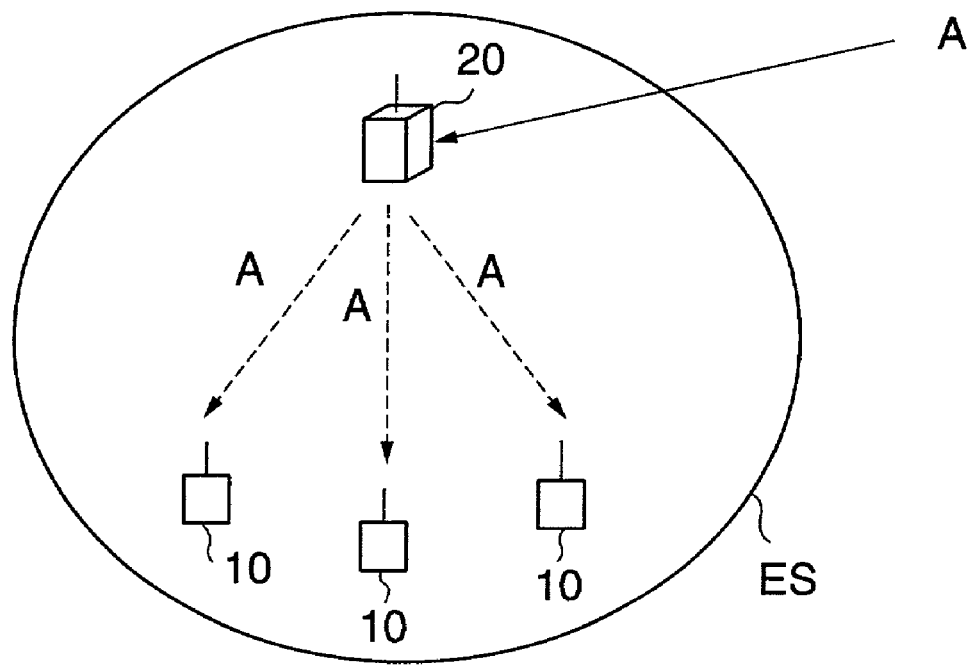
FIG. 5 is a block diagram showing an example of a basic configuration of a multicast service providing system in a first embodiment of the present invention.

This system is configured as shown in FIG. 5.

In FIG. 5, a radio base station 20 broadcasts information A (henceforth, referred to as multicast information) provided, for example, through a public network, etc. to a service area Es. Radio terminals 10 (cellular phones, personal computers which have a communication function, or the like) present in this service area Es can receive the multicast information A broadcast by the radio base station 20.

Figure 6:
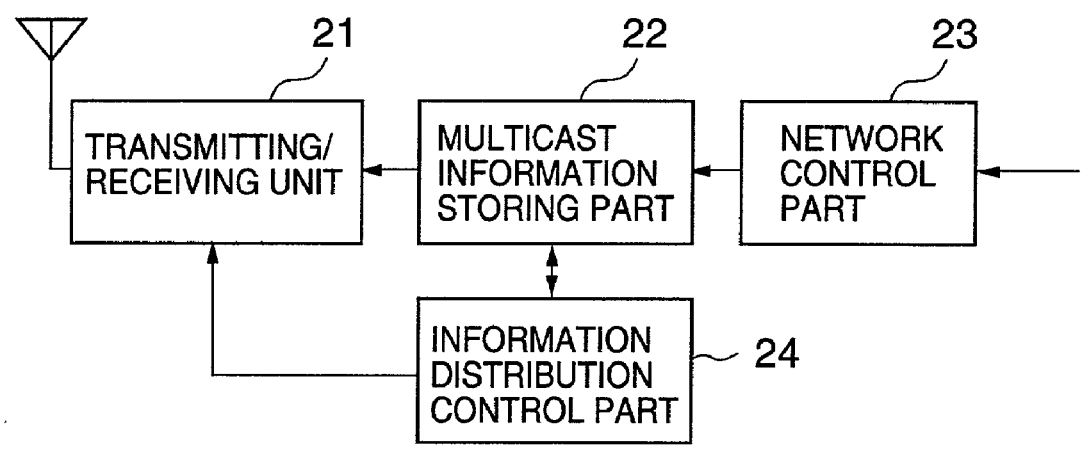
FIG. 6 is a block diagram showing an example of a configuration of a radio base station in the system shown in FIG. 5.

The radio base station 20 is configured as shown in FIG. 6.

In FIG. 6, this radio base station 20 has a transmitting/receiving unit 21, a multicast information storing part 22, a network control part 23, and an information distribution control part 24. The transmitting/receiving unit 21 performs radio communications with each radio terminal 10 present in the service area Es. The multicast information storing part 22 stores multicast information to be distributed which the network control part 23 receives from the network. The information distribution control part 24 performs control for distributing the multicast information stored in the multicast information storing part 22 through the transmitting/receiving unit 21 to each radio terminal 10 present in the service area Es.

The information distribution control part 24 has a management table as shown in FIG. 7. This management table is used for managing as to whether requests for continuation have been made for various distribution services of multicast information. In FIG. 7, when continuation requests for various distribution services (multicast groups) of multicast information are made, flags (#1, #2, #3, and #4, referred to also as received flags) corresponding to the services are made to be ON, and, when no continuation requests for distribution services of multicast information are made, the flags corresponding to the services are made to be OFF.

Figure 8:
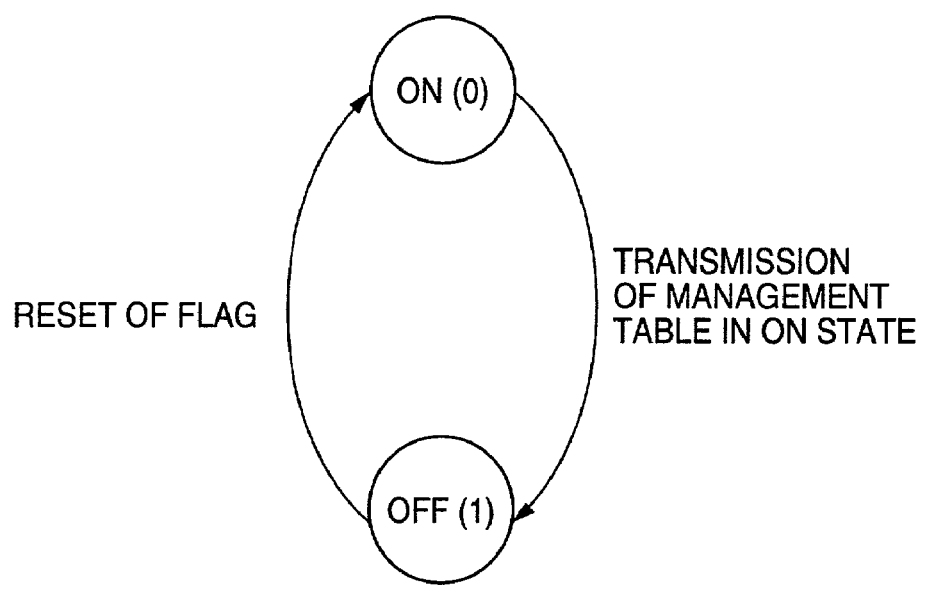
FIG. 8 is a diagram showing an example of state transition in the radio base station.

Moreover, the radio base station 20 (information distribution control part 24) resets (makes to be OFF) all the flags in the above-mentioned management table at a predetermined timing. Then, the state (ON/OFF) of each flag managed in the above-mentioned management table is broadcast from the radio base station immediately after the flag reset timing (after a predetermined time). Such a state of the radio base station 20 is managed by a reset state flag of a reset state item in the above-mentioned management table. Namely, the reset state flag is made to be ON (ON) together with resetting (OFF) of the flags corresponding to the above-mentioned various distribution services, and the reset state flag is made to be OFF (OFF) from a timing immediately after that (after a predetermined time) at which each flag state is broadcast until all the flags are subsequently reset. Therefore, the state of the radio base station 20 changes by turn between a state where the reset state flag is made to be ON (ON), and a state where the reset state flag is made to be OFF (OFF), as shown in FIG. 8.

Figure 9:
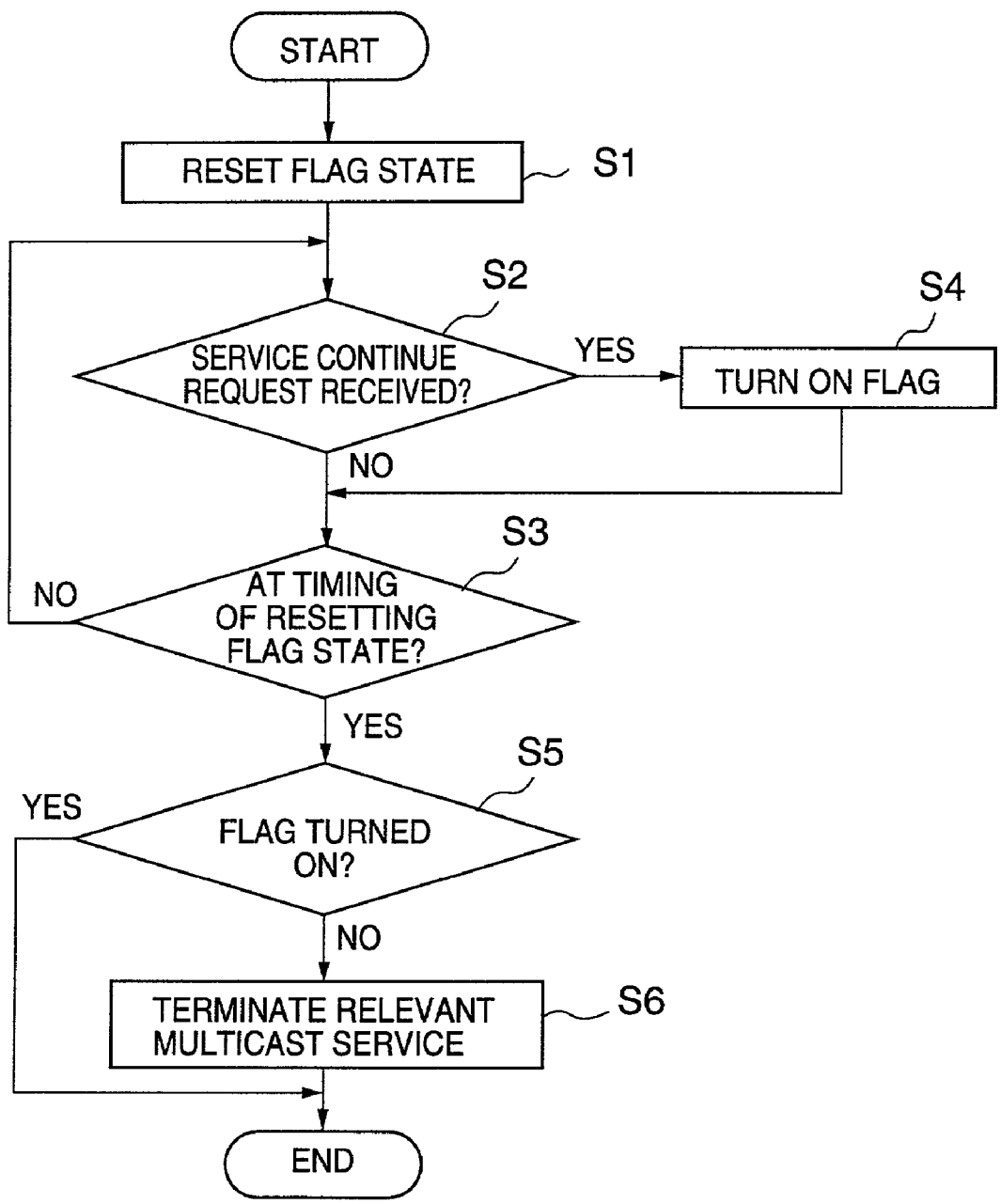
FIG. 9 is a flow chart which shows an example of a processing procedure in the radio base station.
Figure 10:
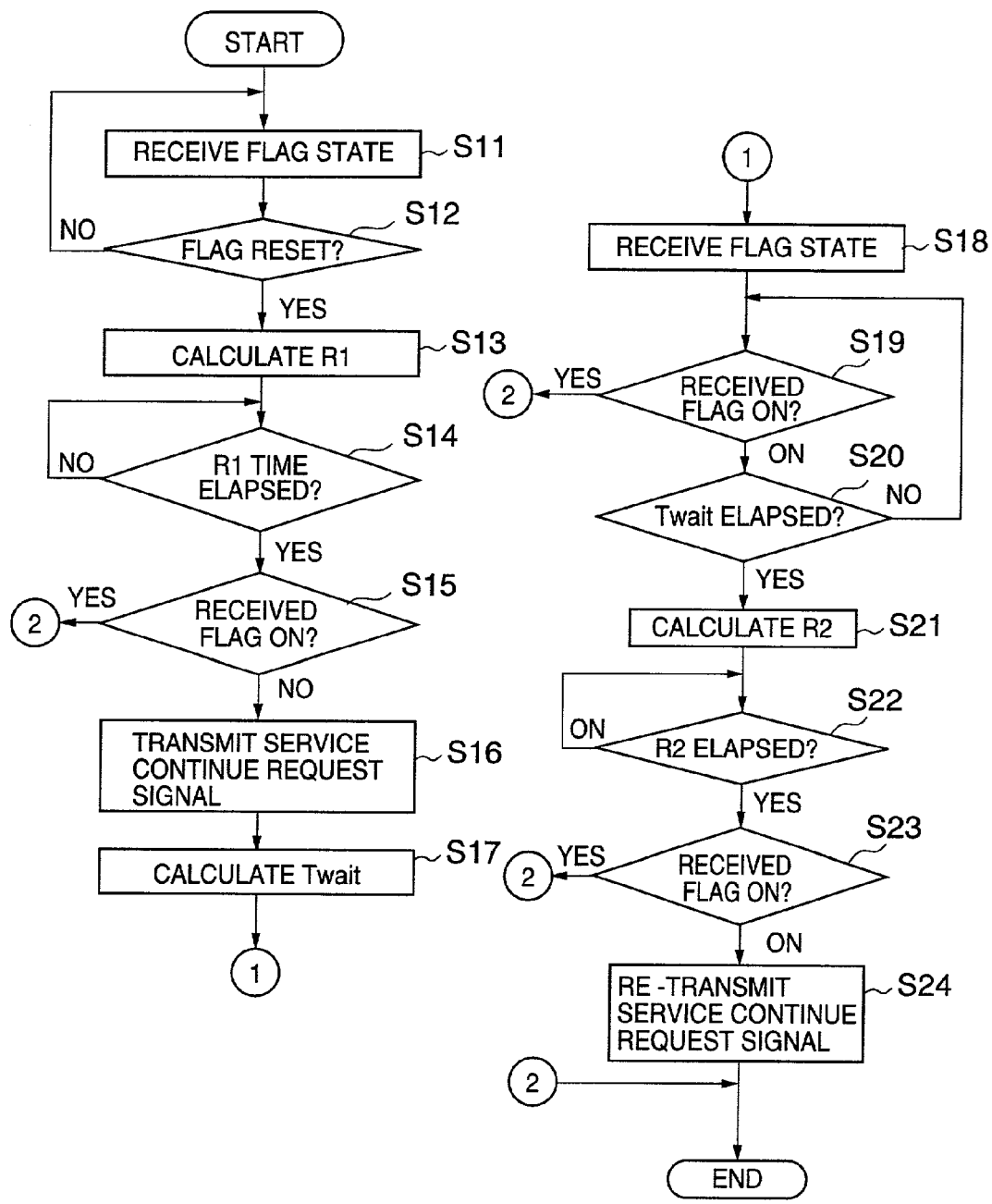
FIG. 10 is a flow chart which shows an example of a processing procedure in each radio terminal.

In case the various distribution services of multicast information are provided from the radio base station 20, processing is performed by the radio base station 20 according to a procedure shown in FIG. 9, and the radio terminal 10 which receives the multicast information performs processing according to a procedure shown in FIG. 10.

In FIG. 9, the radio base station 20 resets the flags (#1, #2, #3, #4) corresponding to all the distribution services in the above-mentioned management table (see FIG. 6) at a predetermined timing (S1). The reset state flag is made to be ON at this time. The reset state flag is made to be OFF immediately after that (after the predetermined time). Thus, a signal showing the reset state flag which is made to be ON or made to be OFF is broadcast using a different channel from a channel used for the various distribution services of multicast information. Moreover, when the above-mentioned reset state flag is switched to OFF, a signal showing the states of the flags corresponding to the various distribution services managed in the above-mentioned management table are broadcast using the predetermined channel.

When the flags corresponding to all distribution services are reset as mentioned above, it is determined (S3) whether it is the subsequent timing of flag reset, while it is determined (S2) whether the radio base station 20 has received a service continuation request signal (which will be described later in details) from any one of the radio terminals 10. In this process, in response to reception of the service continuation request signal from any one of the radio terminals 10 (YES at S2), the flag corresponding to the relevant service is made to be ON in the management table (S4).

When it becomes the subsequent timing of flag reset (YES at S3), it is determined whether the flag corresponding to each service of the management table has been made to be ON (S5). Then, the distribution service corresponding to the flag which has been made to be ON is continued, the distribution service corresponding to the flag which has been made to be OFF is terminated (S6), and then, the series of processing is finished (YES at S5). Then, again, while all the flags corresponding to distribution services of multicast information are reset, and, also, the series of processing is started from the processing (S1) at which the reset state flag is made ON.

Each radio terminal 10 which receives distribution service of multicast information performs processing according to a procedure shown in FIG. 10, while the radio base station 20 performs the above-describe processing and provides the various distribution services of multicast information.

In FIG. 10, the radio terminal 10 receives a signal indicating the reset state flag broadcast by using the predetermined channel, and, in this process, it determines (S12) whether or not this reset state flag is made to be ON, i.e., whether the flags corresponding to the multicast information distribution services are reset. When it is determined that the reset state flag is made to be ON (YES at S12), a random time R1 is calculated based on a random number generated by a random number generator (S13). Then, a timer in which the random time R1 is set starts operation. After that, it is determined (S14) whether or not the timer has reached the random time R1 which is the set time thereof.

When the timer has reached the time R1 (time out), a signal showing the flag corresponding to the multicast information distribution service which the radio base station 20 broadcasts is received from the timing at which the reset state flag is made to be OFF, and it is determined whether the flag corresponding to the service which the radio terminal 10 receives is made to be ON (S15). There, when the relevant flag (received flag) is made to be OFF (NO at S15), as management is made by the radio base station 20 such that it is recognized that the service continuation signal for the corresponding service has not been received, the radio terminal 10 transmits the service continuation signal to the radio base station 20 in case it desires continuation of the service (S16).

Then, Twait which is a random time is calculated (S17), and reception of the signal showing the states of the flags corresponding to the various multicast information distribution services broadcast from the radio base station 20 is started (S18). Then, it is determined whether or not the random time Twait has been reached (S19), while it is determined whether the flag (received flag) corresponding to the distribution service which the radio terminal 10 receives is made to be ON (S20). There, in case the flag corresponding to the relevant service has been already made to be ON (see the processing at S2 and S4 in FIG. 9) in response to the service continuation request signal transmitted from the relevant radio terminal 10 as mentioned above (see the processing in S16), the radio terminal 10 finishes the series of processing, and repeats the processing of determining whether or not the reset state flag is made to be ON (the flags corresponding to the services are made to be OFF) again (S11, S12).

In a condition where the random time R1 has elapsed from the timing of detection of ON of the reset state flag, when the flag corresponding to the relevant service has been already made to be ON in the radio base station 20 in response to the service continuation request signal from another radio terminal 10 which receives the service (YES at S15), the radio terminal 10 finishes the series of processing, and repeats the processing of determining whether or not the reset state flag is made to be ON (the flags corresponding to the services are made to be OFF) again (S11, S12).

Figure 11:
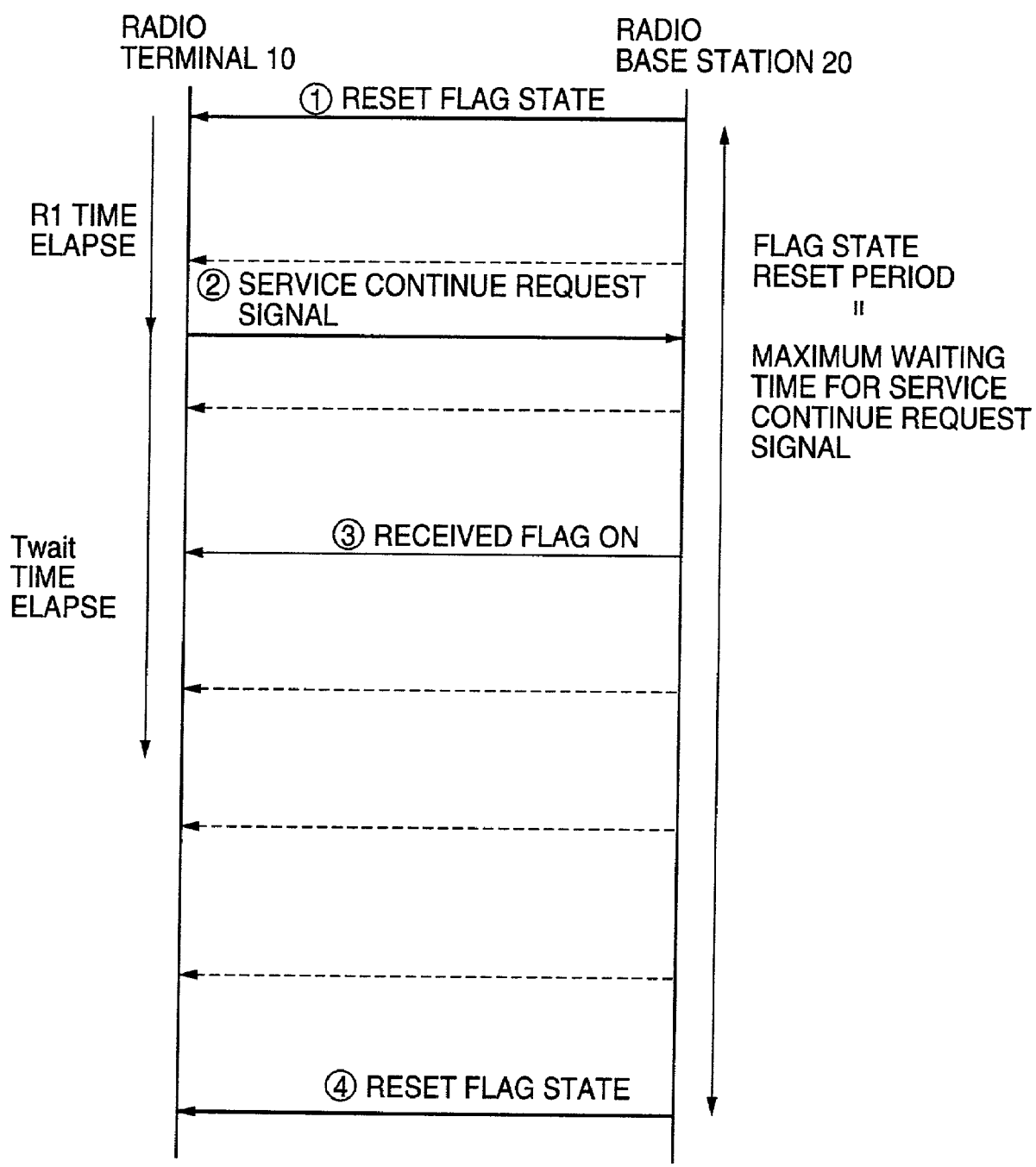
FIG. 11 is a sequence diagram showing an example (number 1) of a communication procedure between the radio base station and the radio terminal.

As a result of the processing being performed in accordance with the above-described procedure by the radio base station 20 and radio terminals 10, a communication according to a sequence shown in FIG. 11 is performed between the radio base station 20 and the radio terminals 10, for example.

In the process in which the multicast information distribution service is made on the radio terminal 10 by the radio base station 20, when the reset state flag is made to be ON by the radio base station 20 (①), that is, the flags (received flags) corresponding to the respective services are made to be OFF, the signal indicating the flags corresponding to the various services are transmitted to the radio terminal 10 by the radio base station 20 at predetermined timing repeatedly (see broken line in FIG. 11). In this process, when receiving the signal indicating the reset state flag having the ON state (the flags corresponding to the services are made to be OFF) from the radio base station 20 (①), the radio terminal 10 transmits the service continuation request signal to the radio base station 20 after elapse of a random time R1 (②). Then, the radio terminal 10 monitors as to whether the flag corresponding to the relevant service is made to be ON during a random time Twait.

When receiving the above-mentioned service continuation request signal from the relevant radio terminal 10 or another radio terminal 10, the radio base station 20 makes the flag corresponding to the service to be ON. When detecting that the flag corresponding to the service has been made to be ON (①), the radio terminal 10 monitors the reset state flag being made to be ON (④). Then, each time the reset state flag is made to be ON, communication is performed between the radio base station 20 and radio terminal 10 in accordance with the above-mentioned procedure.

By the above-mentioned processing, the radio base station 20 resets (makes to be OFF) the flags corresponding to the various multicast information distribution services at predetermined timing, and, also, after the resetting, when receiving the service continuation request signal from any radio terminal 10, the radio base station 20 makes the flag corresponding to the service to be ON. Accordingly, the radio base station 20 can determine continuation and termination of the services based on the flags corresponding to the respective services managed by the management table (see FIG. 7) without managing the number of the radio terminals 20 which receive the multicast information distribution services in the service area Es, or the like.

Moreover, each radio terminal 10 can check whether another radio terminal 10 which requires the same service as that of itself exists in the same service area Es by monitoring the states of the flags (received flags) corresponding to the respective services broadcast from the radio base station 20. Then, when the relevant flag is made to be OFF, the radio terminal 10 which desires the service transmits the service continuation request signal to the radio base station 20, as recognizing that no other radio terminal 10 which requires the same service as that of itself exists. On the other hand, when the relevant flag is made to be ON, the radio terminal 10 that desires the service does not transmit the service continuation request signal, as recognizing that another radio terminal 10 which requires the same service as that of itself exists.

Thus, the service continuation request signals are not transmitted from a plurality of radio terminals 10, respectively, which desire the same service in the same service area Es, and thus congestion is not likely to occur in the radio section.

In case the service continuation request signal is transmitted from the radio terminal 10 which processes according to the above-described procedure (see FIG. 10), the service continuation request signal may be unable to be received by the radio base station 20 due to interference of signals, collision with the service continuation request signal simultaneously transmitted by chance from another radio terminal, or the like in the radio channel. In such a case, as will be described below, the radio terminal 10 performs re-transmission of the service continuation request signal.

After transmitting the service continuation request signal to the radio base station 20 (S16), the radio terminal 10 which processes in accordance with the above-described procedure shown in the FIG. 10 further calculates a random time R2 again (S21) after a random time Twait has elapsed, in case the OFF state of the flag corresponding to the service received from the radio base station 20 is maintained during the random time Twait (NO at S19, and also, YES at S20). Then, after the random time R2 elapsed (YES at S22), it determines again whether or not the flags (received flags) corresponding to the services broadcast by the radio base station 20 are made to be ON (S23). Then, when the flag corresponding to the service has the ON state, the radio terminal 10 finishes the series of processing while receiving the multicast information distribution service broadcast by the radio base station 20.

The radio terminal 10 re-transmits the service continuation request signal, as recognizing that the service continuation request signal (see S16) transmitted last time has not been received by the radio base station 20, when the flag corresponding to the service received has the OFF state (S24). Then, after finishing re-transmitting of the service continuation request signal, the radio terminal 10 finishes the series of processing.

Figure 12:
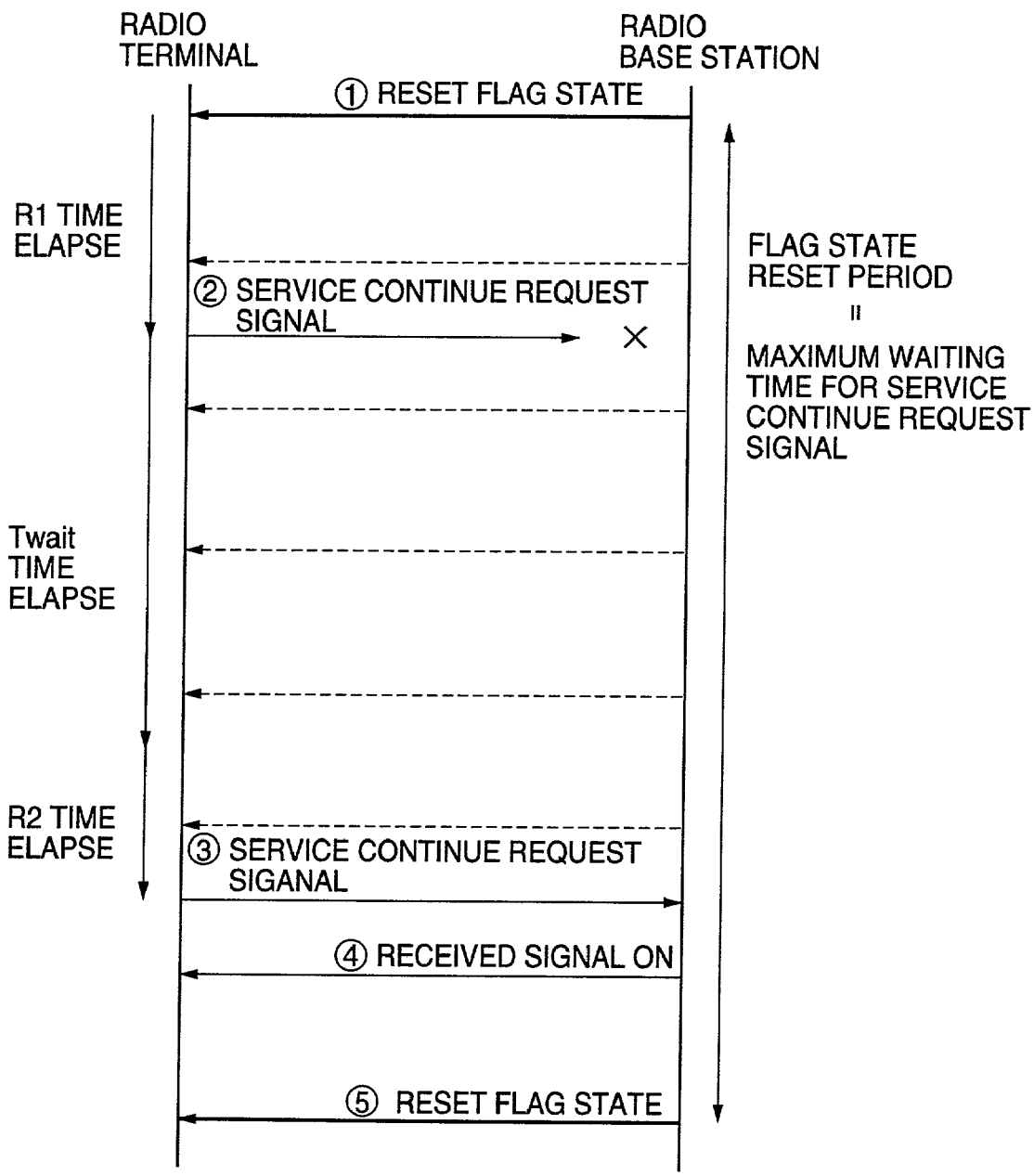
FIG. 12 is a sequence diagram showing an example (number 2) of the communication procedure between the radio base station and the radio terminal.

Between the radio base station 20 and the radio terminal 10, as a result of the processing according to the above-described procedure being performed by he radio terminal 10, communication according to a sequence shown in FIG. 12 is performed.

In the process in which the radio base station 20 is performing multicast information distribution service on the radio terminal 10, when the reset state flag is made to be ON by the radio base station 20 (①), same as in the case described above (see FIG. 11), that is, when the flags corresponding to the respective services (received flags) are made to be OFF, the signal indicating the states of the flags corresponding to the respective services is repeatedly transmitted to the radio terminal 10 from the radio base station 20 at predetermined timing (see the broken line in FIG. 12). In this process, when receiving the signal indicating the reset state flag having the ON state (the flags corresponding to the services are made to be OFF) (①), the radio terminal 10 transmits the service request continuation signal to the radio base station 20 after elapse of a random time R1 (②). Then, the radio terminal 10 monitors, during a random time Twait, whether the flag corresponding to the relevant service is made to be ON.

In case the above-mentioned service request signal is not received by the radio base station 20 by some reason such as signal interference or collision (× mark), and the flag corresponding to the service given from the radio base station 20 is not made to be ON during the random time Twait, the radio terminal 10 re-transmits the service request continuation signal (③) after further elapse of the random time R2 after elapse of the random time Twait. When the flag corresponding to the relevant service managed by the radio base station 20 is made to have the ON state by this service continuation request signal re-transmitted by the radio terminal 10, after receiving this flag in the ON state (④), the radio terminal 10 monitors that the reset state flag is made to be ON (⑤).

Since the service continuation request signal is re-transmitted from the radio terminal 10 when the service continuation request signal transmitted from the radio terminal 10 is not received by some reason by the radio base station 20, the flag corresponding to the relevant service managed by the radio base station 20 can be positively made into the ON state.

In the above-mentioned system, relationship between the reset period Treset, that is, the period at which the flags corresponding to all the multicast information distribution services are reset, the above-mentioned random times R1 and R2, and the random time Twait are set as follows, for example.

When making the random time Twait constant, it is set as follows:

$$T\text{wait} = T\text{reset} - R1\text{max} - R2\text{max} \quad (1)$$

Moreover, when making the random time Twait variable, it is set as follows:

$$Twait = (Treset - R1max) \times RATE \qquad (2)$$

When making the Twait constant and applying the same value for every Treset cycle, the maximum time of Twait is calculated according to the above-mentioned formula (1). Accordingly, calculation of Twait is realizable by setting up a value smaller than Treset−R1 as the maximum (R2max) of R2, and then using the above-mentioned formula (1).

Moreover, when making the Twait variable and changing it for every Treset, it is also possible to use a value acquired by multiplying (Treset−R1) by a fixed coefficient RATE. In this case, since R1 is a random value, Twait can be made variable. As RATE becomes larger in the above-mentioned formula (2), the maximum of R2 becomes smaller, and probability of collision at the time of re-transmitting becomes higher. However, since the probability that the service continuation request signal from another radio terminal which receives the same multicast information distribution service is transmitted becomes higher, there is an advantage that the necessity of re-transmission becomes lower.

On the other hand, when RATE is smaller in the above-mentioned formula (2), the probability of collision with the service continuation request signal from another radio terminal which receives the same multicast information distribution service becomes higher. However, since R2 can be made larger, there is an advantage that the probability of the collision with the service continuation request signal from another radio terminal which receives the same multicast information distribution service becomes lower, at the time of re-transmitting the service continuation request signal.

Moreover, the probability of collision of the service continuation request signals can be reduced by making RATE in the above-mentioned formula (2) have a unique value for every radio terminal.

Although, in the above-mentioned example, re-transmitting of the service continuation request signal is made once, it is easily realizable to change respective parameters so that re-transmitting of the service continuation request signal may be performed several times.

Namely, Twait and R2max may be set such that:

$$Treset = A \times (Twait + R2max) \qquad (3)$$

'A' is an integer and expresses the number of times of retransmissions.

As, for the radio base station connected to the network which supports the version 1 of IGMP, the maximum time for which an IGMP router waits for a report from a host is 10 seconds, and, thereby, it is reasonable to set the Treset period of the radio base station equal to or shorter than 10 seconds. Since the maximum time for which the IGMP router waits for the report from the host is specified in a message in the case of the network corresponding to the version 2, it is reasonable to set the Treset period to be equal to or shorter than the specified time. However, as for this Treset period, it is also possible to set it regardless of the parameter of IGMP, and, then, for the router, the radio base station may perform operation in accordance with IGMP. Furthermore, in case multicast information distribution service in a network which does not support IGMP is carried out, this Treset period may be set as a value original for the radio base station.

In each above-mentioned example, the radio base station acts as an information distributing apparatus.

A second embodiment of the present invention will now be described.

In this embodiment, a radio channel used for distribution of each multicast information is informed of to each radio terminal of a service area. Thereby, each radio terminal can receive the desired multicast information by using the radio channel corresponding to the multicast information.

A basic configuration of a multicast service providing system in the second embodiment is configured as shown in FIG. 5, same as the above-described embodiment, and, also, a radio base station is configured as shown in FIG. 6.

In the present invention embodiment, an information distribution control part 24 manages multicast service by a multicast information channel table as shown in FIG. 13. In this multicast information channel table, relationship between multicast group addresses for identifying multicast information channels for performing distribution services, transmission channels used for transmitting the multicast information corresponding to the respective multicast information channels, and information channel numbers managed by a radio base station 20 is described.

The multicast group addresses for identifying the multicast information channels for providing the distribution services are used for identifying the contents of distribution services, and, are the same as multicast addresses, for example, used by IGMP (Internet Group Management Protocol) which is the multicast protocol of IP (Internet Protocol) network. However, in case the radio base station 20 is connected with a network other than the IP network, any addresses which can be used for identifying servers and the networks providing the multicast services can be used as the multicast group addresses.

The transmission channels are expressed by channel identifiers by which the radio base station 20 and each radio terminal 10 can use for identification, and indicate channels for transmitting the multicast information corresponding to the multicast information channels. In case the access type is, for example, a time division multiple access type (TDMA), channel identifiers include time slot numbers in radio frames and frequency numbers. There may also be a system which requires neither frequencies nor time slots for identifying the radio channels, and a system which requires another identifiers. In such a case, any type of identifiers which are used for identifying the radio channels according to an identification method suitable for the system may be used.

In case transmission channels are changed according to a situation of channel allocation in a radio section between the radio base station 20 and each radio terminal, the item of the transmission channel of this multicast information channel table is updated.

An information channel number is a number which the radio base station 20 gives for a multicast group address. The information channel numbers are numbers unique only to the service area Es of the radio base station 20, and, when the radio terminal 10 moves to another service area by handoff, etc., and connection switching to another radio base station is made, information channel numbers managed by the newly connected radio base station are used.

These information channel numbers correspond to the multicast group addresses, as described above, and may be used as the multicast information channels between the radio base station 20 and each radio terminal 10, i.e., simple identifiers for the contents of distribution services.

Figure 14:
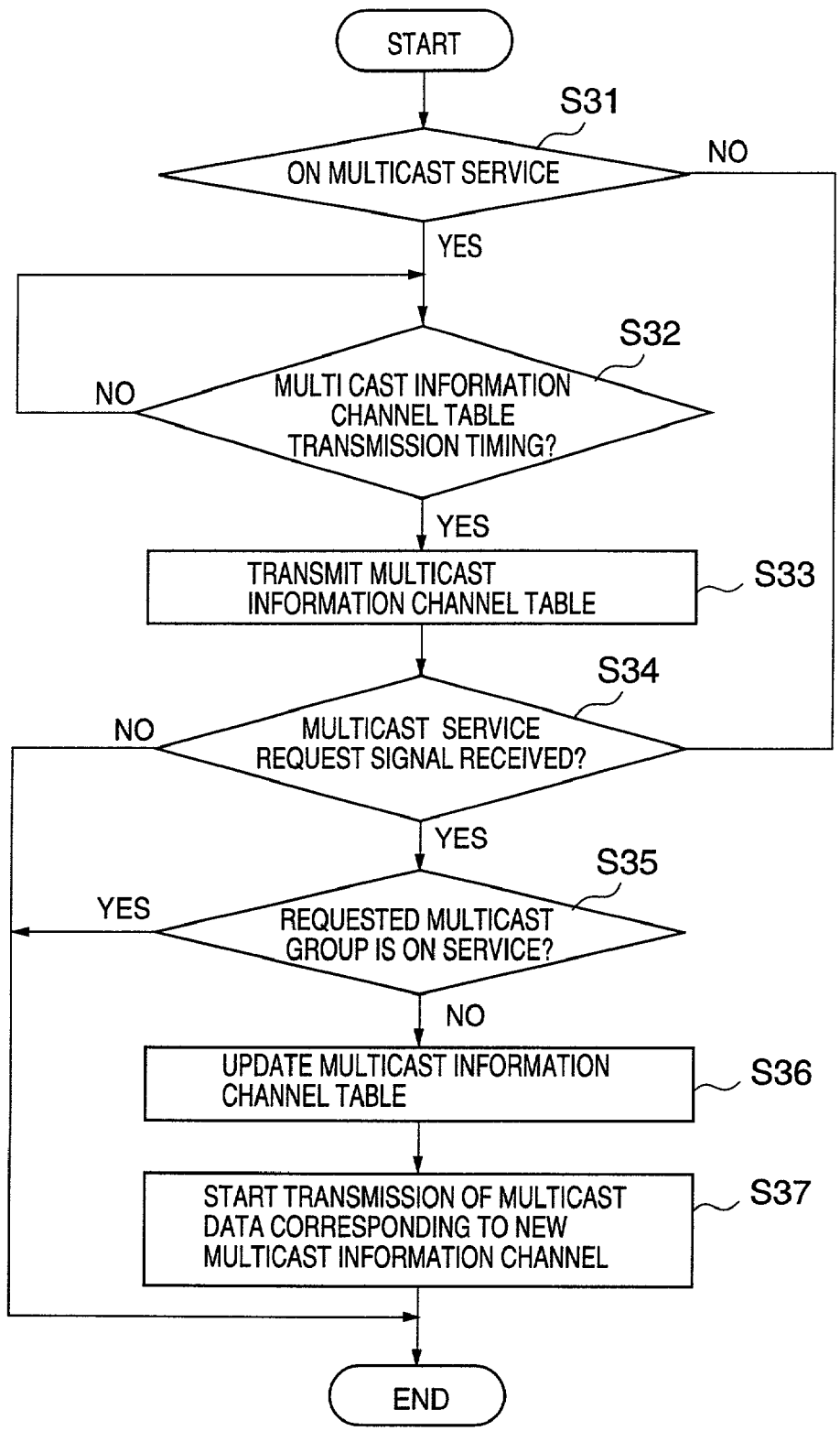
FIG. 14 is a flow chart which shows an example of a processing procedure in the radio base station which performs service provision.

The radio base station 20 which provides the multicast services processes in accordance with a procedure shown in FIG. 14. This processing is mainly performed by the information distribution control part 24 of the radio base station 20.

The radio base station 20 enters one state of state of providing multicast service and a state of not doing so. In FIG. 14, it is determined whether the radio base station 20 is performing multicast service (S31). When the multicast service is performed (YES at S31), it is monitored whether it is a transmission timing for the multicast information channel table (see FIG. 13) which shows information concerning the multicast information channels under the service (S32), and, when it is the timing, the multicast information channel table is informed of to all the radio terminals 10 in the service area Es (S33).

Then, it is determined whether a multicast service request signal is received from anyone of the radio terminals 10 (S34). When the multicast service request signal is received by none of the radio terminals 10 (NO at S34), the series of processing is finished. After that, as long as the multicast service request signal from the radio terminal 10 is not received, processing (S31 through S34) described above is performed repeatedly. Consequently, each radio terminal 10 in the service area Es can know the contents of services distributed at the time, and the radio channels for receiving the contents of the services, by receiving the multicast information table transmitted from the radio base station 20.

The above-mentioned transmission (S33) of the multicast information table is made by using a radio channel which can be used by the radio base station 20. The radio channel which can be used should be a radio channel determined according to a channel allocation method which the radio base station 20 employs. The radio channel used for transmission of this multicast information channel table is informed of to each radio terminal 10 present in the service area Es from the radio base station 20 using a perch channel, for example. Each radio terminal 10 receives the multicast information table from the radio base station 20 using the informed radio channel.

In addition, it is also possible to transmit the multicast information channel table from the radio base station 20 periodically at fixed intervals. In this case, control information concerning the transmission period can also be informed of by using the perch channel.

Moreover, the radio channel used for transmission of the multicast information channel table may also be fixed. In this case, when the radio channel known between the radio base station 20 and each radio terminal 10 is previously fixed therebetween, it is not necessary to include the information concerning the radio channel used for transmission of the multicast information channel in the perch channel.

Returning to FIG. 14, in a state in which the radio base station 20 does not perform multicast service (NO at S31), or when, in the above-described process (S31 through S34), a multicast service request signal (including the above-mentioned multicast group address) is received by the radio base station 20 from the radio terminal which newly desires a service (YES at S34), the above-mentioned multicast information channel table (see FIG. 13) is referred to, and it is determined (S35) whether or not the service concerning the request has been already provided. When the service has been already provided (YES at S35), the series of processing is finished, and, the above-described processing (S31 through S34) is repeatedly performed, until a multicast service request signal is received subsequently.

When the service concerning the request has not been provided yet (NO at S35), the multicast information channel table is updated by newly registering into the multicast information channel table the multicast group address which identifies the multicast service concerning the request, the radio channel (transmission channel) used for the service, and an information channel therefor (S36). Then, the radio base station 20 starts transmission of the multicast information corresponding to the service concerning the above-mentioned request using the thus-determined radio channel (S37). After that, the above-described processing (S31 through S34) is performed repeatedly. In this process, the multicast information channel table updated as mentioned above is transmitted to each radio terminal 10 present in the service area Es from the radio base station 20 (S32, S33).

Figure 15:
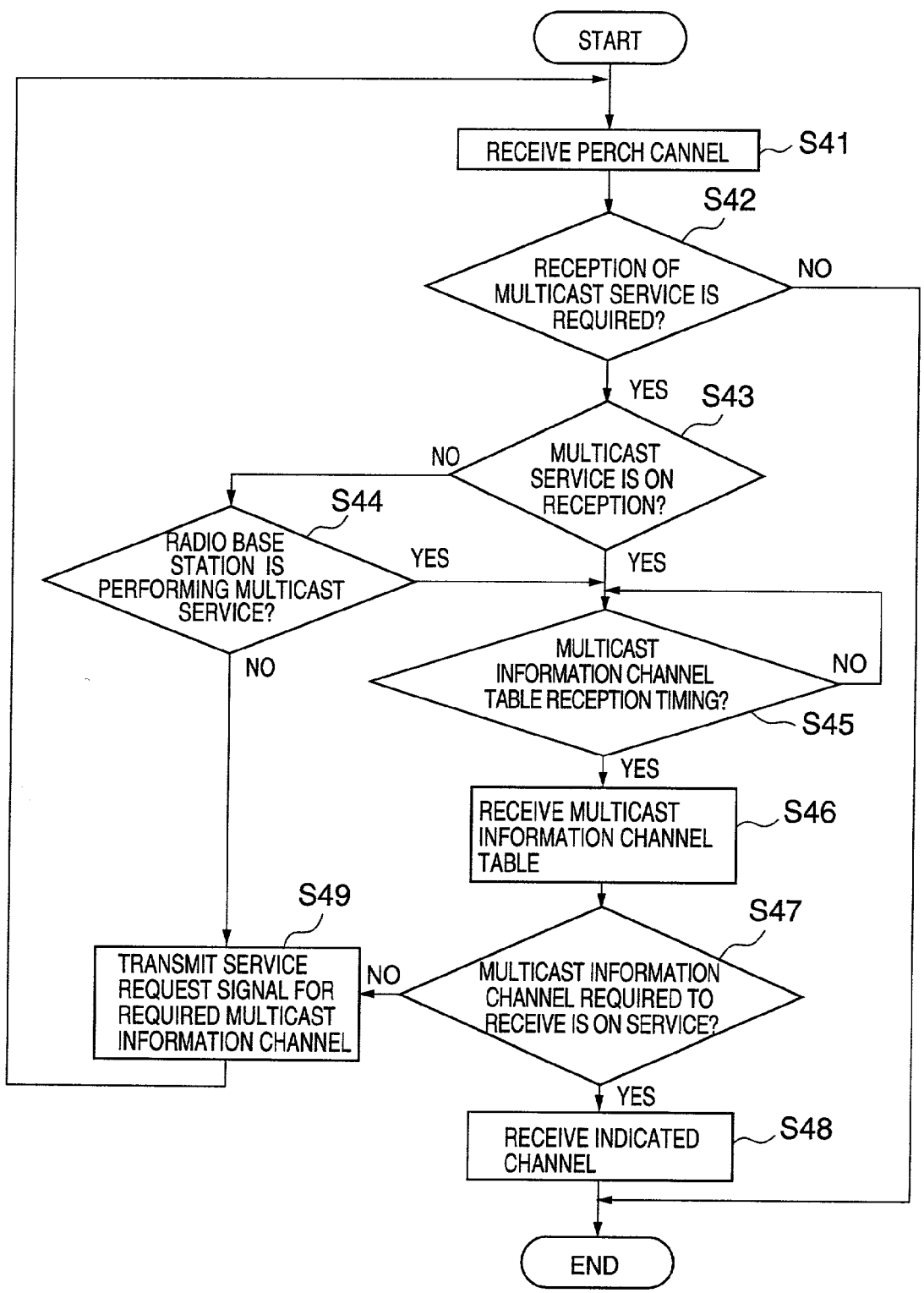
FIG. 15 is a flow chart which shows an example of a processing procedure in the radio terminal which receives service provision from the radio base station.

In the process in which the radio base station 20 performs processing in accordance with the above-described procedure, and provides the multicast services, each radio terminal 10 performs processing in accordance with a procedure shown in FIG. 15.

In FIG. 15, the radio terminal 10 receives the perch channel first (S41). The radio base station 20 transmits, by using this perch channel, various control information concerning the system, also, information indicating whether or not the radio base station 20 is providing multicast service, and, in case of providing the multicast service, transmits information concerning the radio channel used for transmitting the multicast information channel table, transmission period therefor, and so forth.

When reception of multicast service is desired by the radio terminal 10 (YES at S42), it is determined whether the own terminal has already received a certain multicast service from the radio base station 20 (S43). When the own terminal has not received multicast service from the radio base station 20 yet (NO at S43), it is determined whether, based on the information informed of by the above-mentioned perch channel, the radio base station 20 is providing multicast service (S44). When the radio base station 20 is providing multicast service (YES at S44), it is determined, based on the transmission period for the multicast information channel table informed of by the above-mentioned perch channel, whether or not it is a timing of receiving the multicast information channel table (S45). When it is the timing, the multicast information channel table transmitted from the radio base station 20 will be received (S46) using the radio channel informed of by the above-mentioned perch channel.

The radio terminal 10 determines whether or not the multicast information channel (multicast group) which the own terminal desires is registered in the multicast information table, when the multicast information channel table is received thereby (S47). When this multicast information channel desired is registered there (YES at S47), i.e., when distribution service of the desired multicast information has been already performed, the radio terminal 10 receives the distribution information (multicast information) of the multicast information channel using the transmission channel corresponding to the desired multicast information channel in the multicast information channel table (S48).

In the above-mentioned process, when the radio terminal 10 already receives some multicast service (YES at S43), while the above-mentioned service is received thereby, the distribution information of the multicast information channel concerning the relevant new request is received thereby by using the radio channel for receiving the multicast information according to the above-described procedure (S45 through S48).

On the other hand, when the radio base station 20 is not providing multicast service (NO at S44), or, when the radio base station 20 is providing multicast service, but is not providing a service of the desired multicast information channel (NO at S47), the radio terminal 10 transmits a multicast service request signal for the desired multicast information channel to the radio base station 20 (S49), and waits for the radio base station 20 to start the service of the desired multicast information channel. Then, when the multicast information channel table updated by this multicast service request signal (see S34 through S36 in FIG. 14) is received from the radio base station 20 (S46), the radio terminal 10 receives the distribution information of the new multicast information using the radio channel (transmission channel) specified by the multicast information channel table (S47, S48).

As mentioned above, since the radio terminal 10 receives the multicast information channel table from the radio base station 20 by the radio channel informed of by using the perch channel, even when the radio channel by which the multicast information channel table should be transmitted by the radio base station 20 changes, the radio terminal 10 can always receive the multicast information channel table. Moreover, even when the transmission channel by which the information of the multicast information channel (multicast information) is transmitted by the radio base station 20 is changed, since the change is reflected by the multicast information channel table, the radio terminal 10 can receive the distribution information of the desired multicast information channel by the radio channel specified in the relevant multicast information channel table.

In the processing according to the procedure shown in FIG. 15, when the radio terminal 10 does not desire multicast service (NO at S42), the series of processing is finished. Consequently, the radio terminal 10 which does not particularly desire multicast service continues the state of receiving the perch channel (S41, S42).

Figure 16:
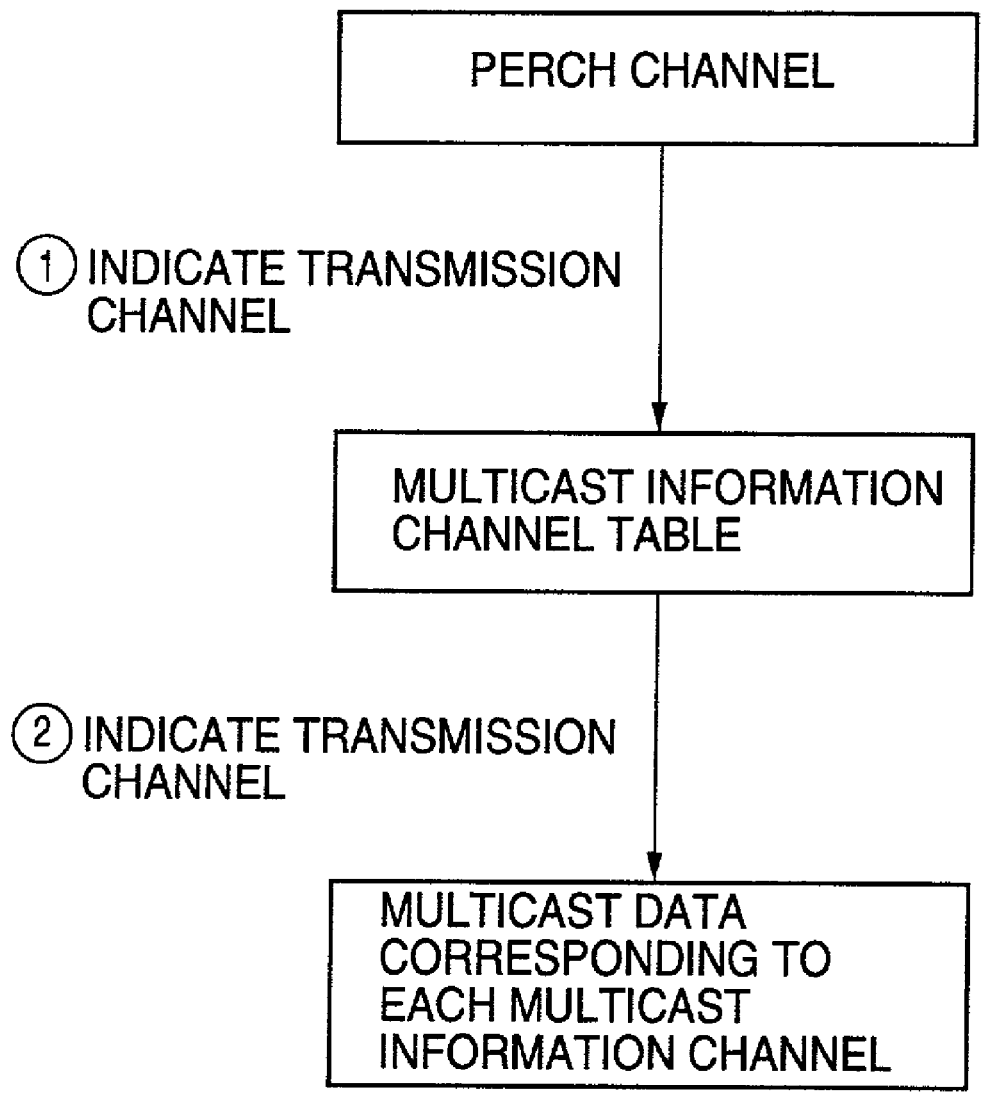
FIG. 16 is a diagram showing an example of a relationship between various information transmitted by the radio base station in case of performing multicast service, and transmission channels therefor.

In the above-mentioned system, multicast information will be distributed to the radio terminal 10 from the radio base station 20 through the processing by the radio terminal 10 according to the procedure shown in the processing of FIG. 15 and the processing by the radio base station 20 according to the procedure shown in FIG. 14, as shown in FIG. 16.

That is, the multicast information channel table is transmitted to the radio terminal using the transmission channel ① informed of by the perch channel, and, further, the distribution information of the multicast information channel (multicast group) registered in the multicast information channel table is transmitted to the radio terminal 10 using the transmission channel ② registered in the multicast information channel table.

Figure 17:
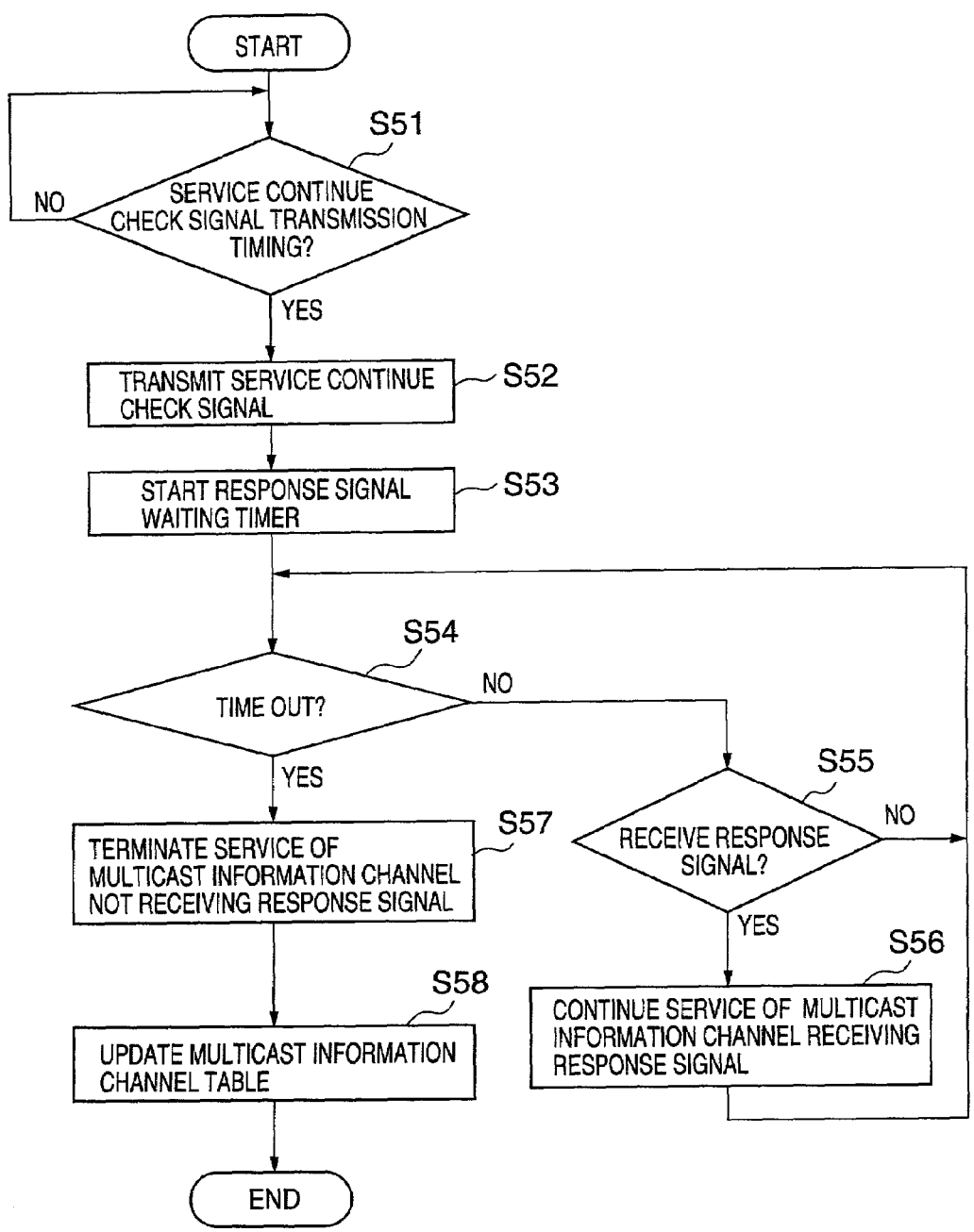
FIG. 17 is a flow chart which shows an example of a processing procedure for the radio base station to determine continuation of service with the radio terminal.

In the above system, during provision of the multicast service, when all the radio terminals that receive the multicast information corresponding to a multicast information channel in the service area Es stop desiring continuation of the relevant multicast service, the radio base station 20 which provides the multicast service processes according to the procedure shown in FIG. 17, for example, in order to stop the multicast service.

In this processing, a service continuation check signal corresponding to the flag state reset signal and a response signal corresponding to the service continuation request signal, described above for the first embodiment, are transmitted and received between the radio base station 20 and the radio terminal 10.

In FIG. 17, it is determined whether it is a timing of transmitting the service continuation check signal (S51). When it is determined that it is the transmitting timing for the service continuation check signal, the service continuation check signal is transmitted to each radio terminal 10 present in the service area Es from the radio base station 20 (S52). Then, a timer at which a response waiting time is set starts operation (S53). In this state, it is determined whether or not the response signal in response to the service continuation check signal is received from anyone of the radio terminals (S55), while it is determined whether or not the relevant timer has reached a time-out state (S54). There, when the response signal is received from any one of the radio terminals before the time-out of the above-mentioned timer, the radio base station 20 enters a state where distribution service of the multicast information channel concerning the response signal is continued (S56). Whenever it receives the response signal in response- to the service continuation check signal for each service from the radio terminal until the above-mentioned timer reaches the time-out state, a state is entered where distribution service of the multicast information channel concerning the response signal is continued (S54, S55, S56).

On the other hand, when the above-mentioned timer reaches the time-out state (YES at S54), distribution service of the multicast information channel for which no response signal is returned in response to the service continuation check signal is terminated (S57). Then, the relevant multicast information channel table is updated by deleting the information concerning this terminated multicast information channel from the multicast information channel table (see FIG. 13) (S58).

Transmission of the above-mentioned service continuation check signal by the radio base station 20 can be performed as follows.

For example, in the perch channel, the multicast group address for which continuation of service is to be checked can be described as the service continuation check signal. In this case, the radio terminal receives the perch channel for every transmission period of this service continuation check signal.

Moreover, the service continuation check signal can be transmitted using the same transmission channel as the transmission channel of the multicast information channel table. In this case, the service continuation check signal is transmitted at the same period as the transmission period of the multicast information channel table. Moreover, as shown in FIG. 18; in this case, a flag as the service continuation check signal can be included in the multicast information channel table. When the multicast information channel table is transmitted, the flag corresponding to the multicast group for which it is the timing for checking continuation of the service is set to "1", and the flag corresponding to the multicast group for which it is not the timing is reset into "0."

Thus, similar to the first embodiment, in case of transmitting to each radio terminal the multicast information channel table including the above-mentioned flag information as the service continuation check signal, when each radio terminal continues reception of the multicast information, it can be determined whether it is necessary to transmit the service continuation request signal, based on the state of the flag information.

Furthermore, the service continuation check signal can also be transmitted by using a different radio channel independently from the multicast information table. In this case, the transmission period of the service continuation check signal can also be set independently, for example, information of the transmission channel for this service continuation check signal is given by using the perch channel.

Figure 19:
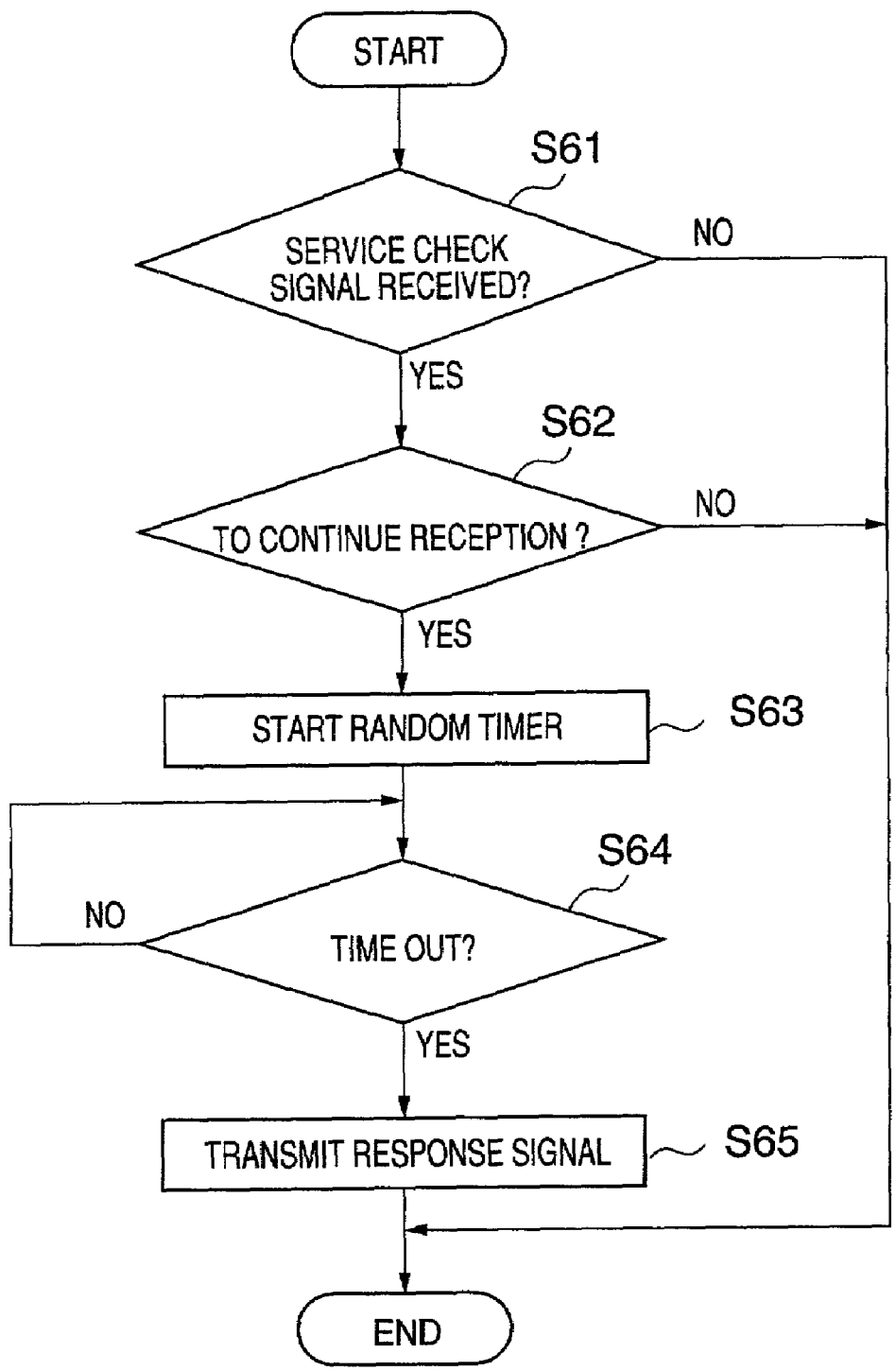
FIG. 19 is a flow chart which shows an example of a processing procedure for informing the radio base station that the radio terminal desires continuation of service.

Each radio terminal which receives the service continuation check signal transmitted from the radio base station as mentioned above processes in accordance with a procedure shown in FIG. 19.

In FIG. 19, when the service check signal is received (YES at S61), in case continuation of the multicast service currently received is desired (YES at S62), the radio terminal starts a random timer in which a random time setting is possible (S63). Then, when the random timer by which the random time is set reaches a time-out state (YES at S64), a response signal is transmitted to the radio base station 20.

Even when the service continuation check signal transmitted from the radio base station 20 is a signal for a specific multicast information channel, even when it is a signal for all the multicast information channels under service by the radio base station 20, the identifies (multicast group addresses, information channel numbers or the like) for indicating all the multicast information channels for which service is desired are contained in the response signal.

Figure 20:
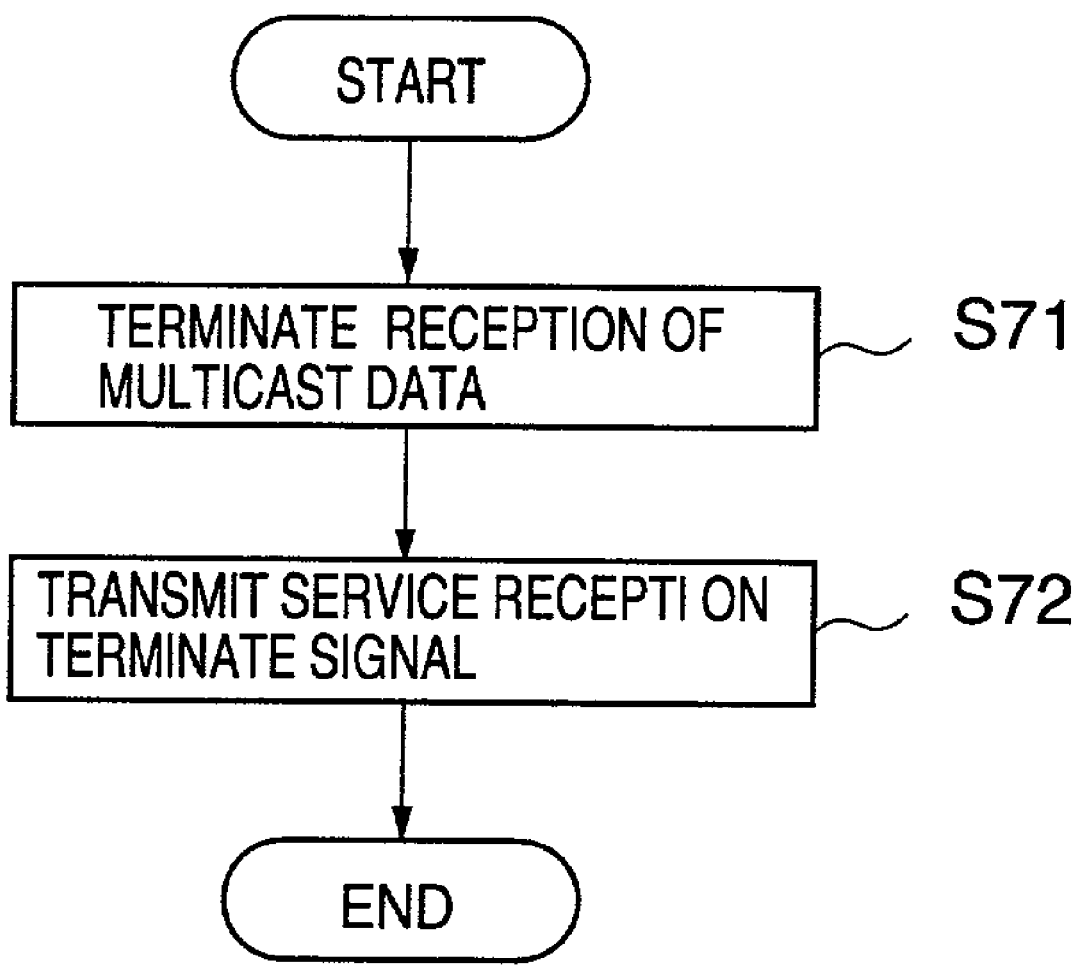
FIG. 20 is a flow chart which shows an example of a processing procedure at a time of the radio terminal terminating reception of multicast information.

Furthermore, when the radio terminal which has received the multicast service positively terminates reception of the service, it processes in accordance with a procedure shown in FIG. 20. That is, reception of the multicast information corresponding to the multicast information channel transmitted from the radio base station 20 is interrupted (S71), and a service reception termination signal is transmitted to the radio base station 20 (S72). The identifiers (multicast group addresses, information channel numbers or the like) which indicate all the multicast information channels for which reception of service be terminated are included in this service reception termination signal.

The radio base station 20 which has received the service reception termination signal from any one of the radio terminals transmits a service continuation check signal for the multicast information channels indicated by the identifiers (multicast group addresses, information channel numbers or the like) contained in the service reception termination signal, to each radio terminal present in the service area Es, and determines the necessity of continuation of the service in accordance with the procedure shown in FIG. 17. Then, when no response signal is received from any of the radio terminals, the radio base station 20 terminates the service of these multicast information channels.

In the example described above, the control signals transmitted to the radio base station 20 from the radio terminal 10 are three, the service request signal, response signal, and service reception termination signal. These signals can be transmitted by a random access channel which is used for accessing the radio base station 20 first, at a time of turning on of the power supply of the radio terminal, or by using user data included in a packet or a control information transmission channel in case during uni-cast communication.

Moreover, in the above-described example, the time division multiple access type (TDMA) is used as an access type for downlink signals from the radio base station 20 to the radio terminal 10. However, a code division multiple access type (CDMA) is also applicable in the above-mentioned example, by a similar manner only by replacing the identifiers by spread codes, etc.

In addition, also in this embodiment, the radio base station 20 acts as an information distributing apparatus.

A third embodiment of the present invention will now be described.

According to this embodiment, in case a mobile set used as a radio terminal moves across service areas (in case of handoff) while receiving multicast distribution of information, switching of base station which acts as a distribution origin for the mobile set can be made smoothly.

Figure 21:
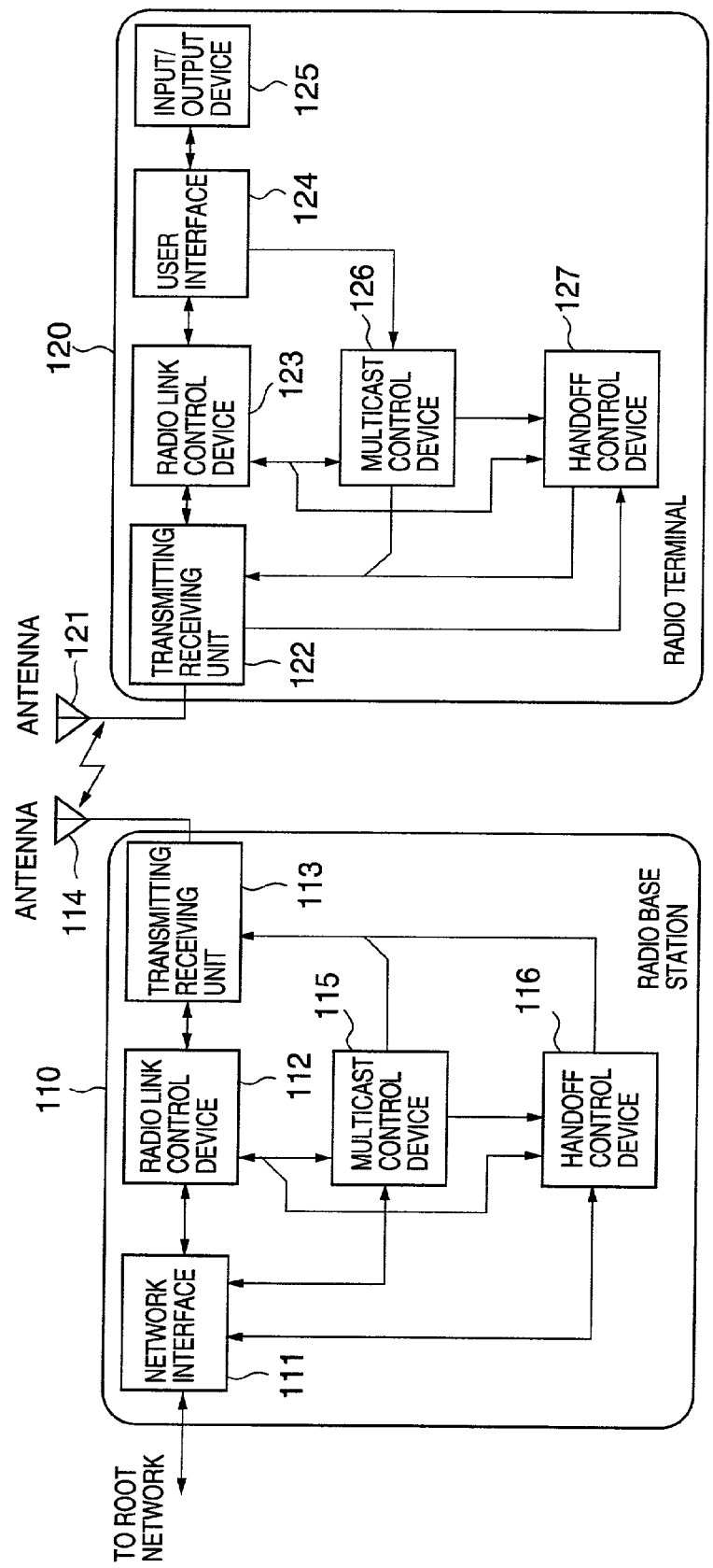
FIG. 21 is a diagram showing an example of a basic configuration of a system to which multicast service providing method in a third embodiment of the present invention is applied.

A system to which a multicast service providing method in the present embodiment is applied is configured as shown in FIG. 21.

The multicast service providing system shown in this figure includes a radio base station 110 and a radio terminal 120. The radio base station 110 transmits (distributes) information (multicast data) provided via a root network, such as an IP network, to the radio terminal 120 present in a radio area. The radio terminal 120 is, for example, a cellular phone, or a personal computer terminal (PC terminal) which has a telecommunication function, the radio terminal 120 receives multicast data distributed from the radio base station, and when a movement arises, the radio base station acting as the other party of communicative is rapidly switched.

The radio base station 110 has a network interface 111, a radio link control device 112, a transmitting/receiving unit 113, an antenna 114, a radio base station side multicast control device 115, a radio base station side handoff control device 116, and an input/output device 117.

The network interface 111 performs control concerning the third layer of OSI reference model. Specifically, when TCP/IP is used as a communication protocol, the network interface 111 performs composition/decomposition of IP packets, and extraction/insertion of multicast addresses.

The radio link control device 112 performs control concerning the second layer of OSI reference model. Specifically, the radio link control device 112 performs composition/decomposition of radio frames which include data channels to which multicast data is inserted, and various control channels, in a combined manner.

The transmitting/receiving unit 113 performs control concerning the first layer of OSI reference model. Specifically, the transmitting/receiving unit 113 transmits and receives radio signals by converting a base-band signal from the radio link control device 12 into radio signal, and transmitting it through the antenna 114 or converting a radio signal given through the antenna 114 into a base-band signal.

The radio base station side multicast control device 115 performs control for multicast cooperatively with a multicast control device of the radio terminal 120 described later. Moreover, the radio base station side multicast control device 115 produces a multicast management table which is information required in order that the radio terminal 120 can receive multicast data. Details of the multicast management table will be described later.

The radio base station side handoff control device 116 gives instructions of distribution of multicast data to the radio base station side multicast control device 115, and performs control of informing the radio terminal 120 of radio channels used for distributing the multicast data to the radio terminal 120. Specifically, based on multicast addresses obtained from the root network via the network interface, and/or information concerning link control obtained from the radio link control device 112, the radio base station side handoff control device 116 performs handoff control for the radio terminal to switch the radio base station acting as the other party of communication, and, also, gives radio channels used for the multicast to the transmitting/receiving unit 113.

Moreover, the radio base station side handoff control device 116 exchanges the multicast management table between the network interface 111 and a radio base station adjacent thereto via the root network connected with the network interface 111, and in order to inform the radio terminal 120 of the multicast management tables of the own station and the adjacent radio base station, it controls the radio link control device 112.

On the other hand, the radio terminal 120 has an antenna 121, a transmitting/receiving unit 122, a radio link control device 123, a user interface 124, an input/output device 125, a radio terminal side multicast control device 126, and a radio terminal side handoff control device 127.

The transmitting/receiving unit 122 and the radio link control device 123 perform operation equivalent to the transmitting/receiving unit 113 and the radio link control device 112 of the radio base station 110, respectively. However, the transmitting/receiving unit 122 also performs measurement of electric field intensity of a signal transmitted from the radio base station 110.

The user interface 124 terminates the TCP/IP protocol for the signal given from the radio link control device 123, and performs interface with an input/output device 125. The input/output device 125 outputs and inputs a sound, a picture, etc., and includes a display, a speaker, a microphone, various keyboards, an external connection terminals, etc.

The radio terminal side multicast control device 126 performs control for the multicast while communicating with the radio base station side multicast control device 115 via the radio link control device 123 based on the information acquired through the user interface 124.

The radio terminal side handoff control device 127 detects an opportunity of handoff, selects a radio base station to which a movement is made, performs request to the radio base station to which the movement is made for distribution of multicast data, and acquires the multicast management table.

Specifically, based on the information concerning electric field intensity obtained from the transmitting/receiving unit 122, and the information concerning the link control obtained from the radio link control device 123, the radio terminal side handoff control device 127 performs synchronization with the radio base station side handoff control device 116 and performs handoff. Moreover, the radio terminal side handoff control device 127 gives the radio channel used for multicast to the transmitting/receiving unit 122.

As embodiments realizing the above-mentioned functions will now be described. A first embodiment is such that the radio terminal requests to the radio base station for which the radio terminal moves, for distribution of multicast data, directly, or, via the radio base station at the movement origin, further acquires information for identifying the radio channel used for the multicast, so that switching of the radio base station which acts as the other party of communication at the time of movement can be made rapidly. A second embodiment is such that the radio base station informs the radio terminal of the multicast management table of the own station and also the multicast management table of an adjacent radio base station, the radio terminal previously determines multicast data which the radio base station on the movement destination distributes, and thus, the radio base station which acts as the other party of communication can be switched rapidly at the time of movement.

Figure 23:
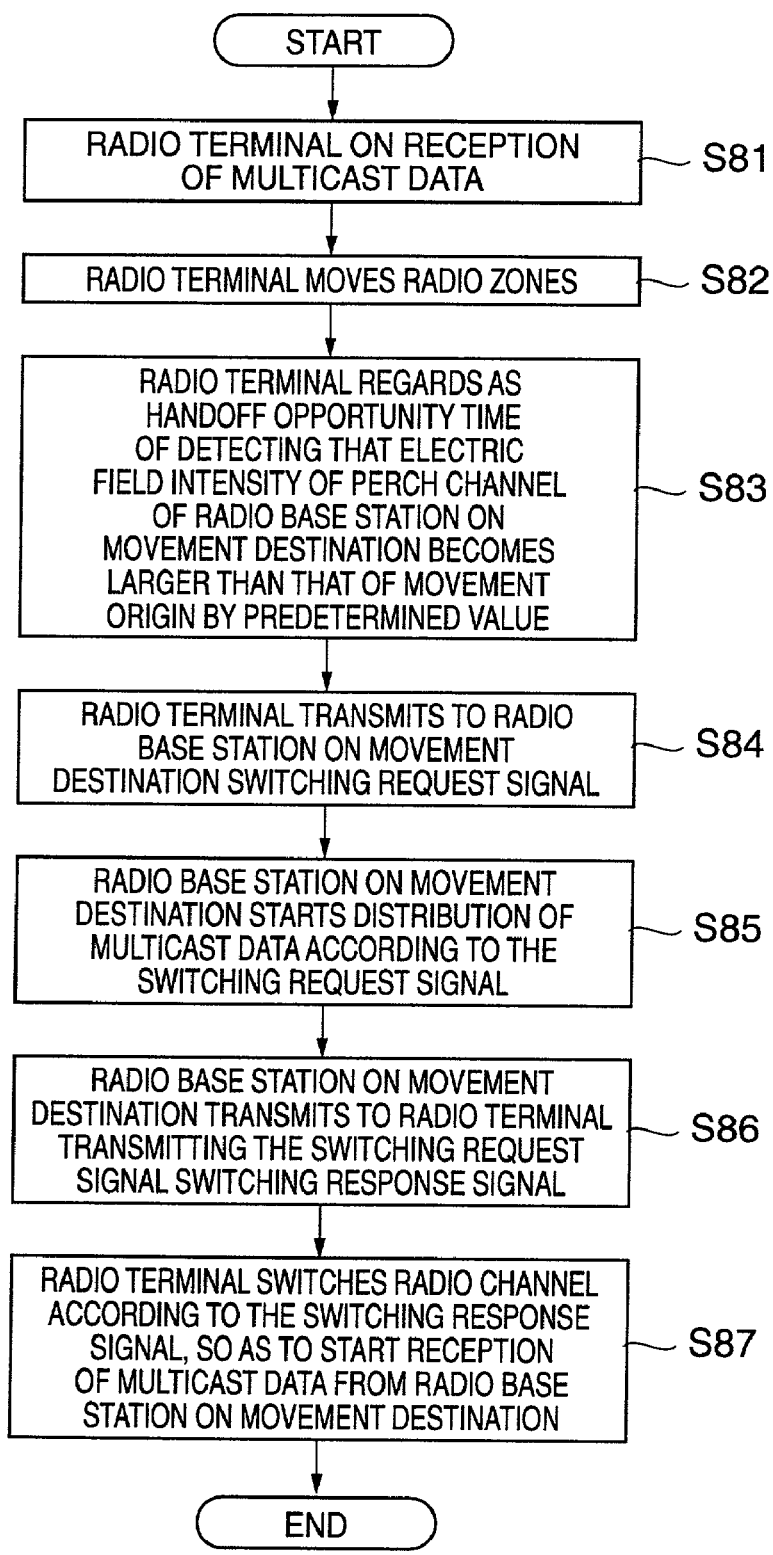
FIG. 23 is a flow of operation in the first example of operation.

First, the first example of operation will now be described. FIG. 22(*a*) and (*b*) shows a conceptual diagram, and FIG. 23 shows an operation flow of the first example of operation. It is assumed that, as shown in FIG. 22(*a*), a radio terminal 120-1 in a radio zone Z1 of a radio base station 110-1 on movement origin moves to a radio zone Z2 of a radio base station 110-2 on movement destination, while receiving multicast data given by the radio base station 110-1 on movement origin.

In this case, as shown in the operation flow of FIG. 23, when the radio terminal 120-1 moves into the radio zone Z2 from the radio zone Z1 (S82) while receiving multicast data (S81), in the radio terminal 120-1, the signal reception intensity from the radio base station 110-2 on movement destination becomes larger than the signal reception intensity from the radio base station 110-1 on movement origin. At this time, the radio terminal side handoff control device 127 built in the radio terminal 120-1 determines (S83), as an opportunity of handoff, the time of the reception intensity of the perch channel from the radio base station 110-2 on movement destination becoming larger than the reception intensity of the perch channel from the radio base station 110-1 on movement origin, based on the reception intensity of the perch channel received periodically.

In case of the opportunity of handoff, the radio terminal side handoff control device 127 transmits a switching request signal for switching the radio base station to be communicated, from the radio base station 110-1 on movement origin to the radio base station 110-2 on movement destination, to the radio base station on movement destination via the radio link control device 123 (S84).

Information which indicates the radio base station 110-2 on movement destination determined from the electric field intensity, information which indicates multicast data which the radio terminal 120-1 desires to receive, information which indicates the radio terminal 120-1 of transmission origin, and so forth, are included in the switching request signal.

A random access channel which the radio base station 110-2 on movement destination which is a transmission origin provides is used for transmission of this switching request signal. Information concerning the random access channel can be acquired from the perch channel from the radio base station 110-2 on movement destination.

The radio base station side handoff control device 116 built in the radio base station 110-2 on movement destination receives the switching request signal from the radio terminal 110-1, and, when the multicast data indicated by the switching request signal is not distributed by the radio base station 110-2, it controls the radio base station side multicast control device 115 to newly distribute the multicast data. The radio base station side multicast control device 115 starts distribution of the multicast data which the radio terminal 120-1 desires to receive, under such control (S85). When the multicast data indicated by the switching request signal is already distributed by the radio base station 110-2, such control to the radio base station side multicast control device 115 by the radio base station side handoff control device 116 is not performed.

Furthermore, the radio base station side handoff control device 116 transmits, via the radio link control device 112, a switching response signal including information which indicates multicast data desired by the radio terminal 120-1 and started to be distributed or already distributed, and information indicating a radio channel used for distributing this multicast data, to the radio terminal 120-1 which has transmitted the switching request signal (S86).

The radio terminal side handoff control device 127 built in the radio terminal 120-1 controls switching of the radio channel according to this switching response signal. Thereby, the radio terminal side handoff control device 127 starts reception of the multicast data from the radio base station 110-2 on movement destination (S87).

By the above-described series of operation, even when the radio terminal 120-1 moves into the radio zone Z2 of the radio base station 110-2 on movement destination from the radio zone Z1 of the radio base station 110-1 on movement origin, the radio base station to be communicated with can be quickly switched.

In S84 of the flow of operation shown in FIG. 23, the radio terminal 120-1 may transmit the switching request signal to the radio base station 110-1 on movement origin. Further, in order for the radio base station 110-2 to increase opportunities to receive the switching request signal so as to receive it positively, the radio terminal 120-1 may transmit the switching request signal to both the radio base station 110-1 on movement origin and radio base station 110-2 on movement destination.

When transmitting the switching request signal to the radio base station 110-1 on movement origin from the radio terminal, it is necessary to include information which indicates the radio base station 110-2 on movement destination in the switching request signal. In this case, when the radio base station 110-1 on movement origin receives the switching request signal, the radio base station side handoff control device 116 built therein transfers the switching request signal to the radio base station 110-2 on movement destination via the network interface 110 and root network, according to the switching request signal. When the radio terminal 120-1 transmits the switching request signal to both the radio base station 110-1 on movement origin and the radio base station on movement destination, the radio base station 110-2 on movement destination needs to select one of the two received switching request signals. There is a method of selecting one having a lower bit error rate between those two received switching request signals as a specific method of selection.

Further, in order for the radio base station to increase opportunities to receive the switching request signal so as to receive it positively, after the radio terminal 120-1 transmits the switching request signal, when the switching response signal is not able to be received thereby even when a predetermined time has elapsed, the switching request signal may be transmitted again. Further, the radio terminal 120-1 may previously transmits the switching request signal several times. Furthermore, the radio terminal 120-1 may transmit the switching request signal several times, and, when the switching response signal is not able to be received thereby even when a predetermined time has elapsed after the several times of transmission, the switching request signal may transmitted again several times.

Thus, according to this example of operation, in case the radio terminal 120-1 moves across radio zones, by transmitting the distribution request to the radio base station 110-2 on movement destination, in response thereto, the radio base station 110-2 on movement destination transmits the multicast data, and the switching request signal including the information indicating this multicast data and information indicating the radio channel used for distributing the relevant multicast data. Thereby, the radio base station to be communicated with can be switch rapidly at the time of movement.

In this example of operation, when a plurality of radio terminals transmit the switching request signals simultaneously, in order to prevent that these signals collide, the radio terminal knows a timing of a multicast management table being informed of from the perch channel of the radio base station on movement destination, and, in case the multicast management table is inform of within a predetermined time, the radio terminal receives the multicast management table. Then, the radio terminal may transmit the switching request signal only when the contents of the multicast management table do not include the multicast data which it desires to continuously receive. On the other hand, in case the multicast data which it desires to receive continuously is included in the contents of the multicast management table, the radio terminal receives the multicast data in accordance with the contents, without transmitting the switching request signal.

Figure 26:
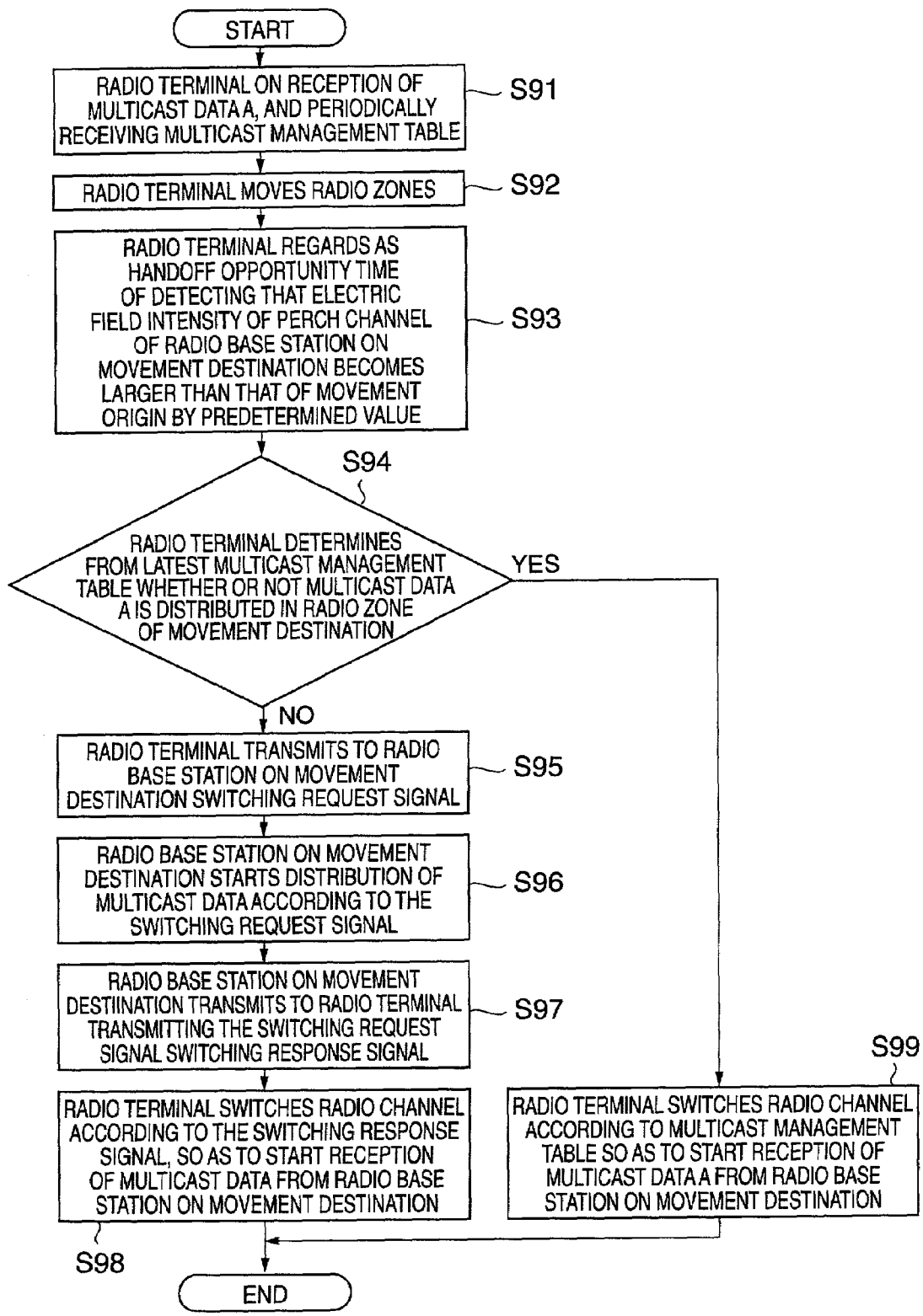
FIG. 26 is a flow of operation in the second example of operation.

Next, the second example of operation will now be described. A conceptual diagram of the operation of the second example is shown in FIG. 24(*a*) and (*b*). Moreover, an example of a multicast management table used in the operation example is shown in FIG. 25, and an example of an operation flow thereof is shown in FIG. 26.

First, the multicast management table used in this embodiment will now be described. In FIG. 24(*a*), the radio base station 110-1 on movement origin receives information concerning multicast data distributed by radio base stations 110-2 through 110-7 adjacent to the own station from the relevant radio base stations 110-2 through 110-7, and, informs to a radio zone Z1 at a period $T_1$ the multicast management table including this information and information concerning multicast data distributed by the own station. The radio terminals 120-1 through 120-3 receive this information transmitted from the radio base station 110-1 on movement origin.

In the multicast management table shown in FIG. 25, the radio base station number on first column is information which indicates the radio base stations 110-1 through 110-7. The radio base station numbers 1 through 7 are related with the respective radio base stations 110-1 through 110-7. The program name on second column is information which indicates each multicast data. The IP address (multicast address) particular to a program name is related with each multicast data. In the example of FIG. 25, the radio base station 110-1 distributes three sorts of multicast data, and the radio base station 110-7 distributes two sorts of multicast data.

The radio channel number on third column is information identifying radio channels, such as a career frequencies, radio slots, and spread codes, used for distribution of the multicast data identified by the program names on second column. The particular radio channel number is related with each radio channel.

The distribution check 1 on fourth column and the distribution check 2 on fifth column are used in order that the radio base station 110 inquires for termination of distribution of multicast data to the radio terminals 120 present in the radio zone on the own station.

Specifically, when multicast data which becomes unnecessary to distribute is included in multicast data distributed from the radio base station 110, the radio terminal 120 transmits a distribution unnecessary notice including information which indicates the multicast data which became unnecessary for the radio base station 110. In order to inquire for permission of distribution termination to the radio terminals 120 present in the radio zone on the own station, the radio base station 110 which has received the distribution unnecessary notice informs the multicast management table in which the value on the distribution check 1 for the multicast data indicated by the distribution unnecessary notice is set as "1", and the values on the distribution check 1 for the other multicast data are set as "0".

When the value on the distribution check 1 for the multicast data which is under reception by itself is "1" in the received multicast management table, the radio terminal 120 sets any value within a predetermined time in a random timer, and, at a timing at which the random timer reaches the time-out state, transmits a response signal including information which indicates the multicast data under reception to the radio base station 110.

When receiving the response signal within a predetermined response interval, the radio base station 110 continues distribution of the multicast data corresponding to the response signal, i.e., continues distribution of the multicast data for which the value "1" is set on the distribution check 1, but terminates the distribution when not receiving the response signal therefor.

There is a case the radio base station 110 cannot receive the distribution unnecessary notice from the radio terminal 120 due to degradation of propagation environment, power supply termination on the radio terminal, or the like. In this case, distribution of unnecessary multicast data is continued and thus effective use of the radio resources cannot be attained. Therefore, the radio base station 110 inquires for permission of distribution termination to the radio terminals 120 present in the radio zone for all the multicast data distributed thereby.

Specifically, the radio base station 110 informs the multicast data in which the value on the distribution check 2 is set as "1" at period Tq which is N times the period Tt of informing of the multicast management table. When the value on the distribution check 2 of the received multicast data is "1" and, also, the multicast data is under reception thereby, the radio terminal 120 sets any value shorter than Tq in a random timer, and, at a timing at which the random timer reaches the time-out state, transmits a response signal including information indicating the multicast data which is under reception thereby.

The radio base station 110 continues distribution for the multicast data indicated by the response signal until the subsequent period Tq has elapsed. On the other hand, when the subsequent period Tq has elapsed from the notice of the multicast data for which the value on the distribution check 2 is set as "1", the radio base station 10 terminates distribution of the multicast data for which no indication has been made until then.

The multicast management table shown in FIG. 25 is produced by the radio base station side handoff control device 116 built in the radio base station 110 periodically transmitting and receiving the multicast management table with the adjacent radio base stations 110 via the network interface 11, and inserting in the multicast management table on the own station the thus-obtained multicast management tables on the adjacent radio base stations 110.

Next, specific operation will now be described. As shown in FIG. 24(*a*), it is assumed that a radio terminal 120-1 in a radio zone Z1 of a radio base station 110-1 on movement origin moves to a radio zone Z1 of a radio base station 110-2 on movement destination.

In this case, as shown in the operation flow of FIG. 26, while the radio terminal 120-1 receives the multicast data A and also receives the multicast management table at a period Tt (S91), it moves into the radio zone Z2 from the radio zone Z1 (S92), in the radio terminal 120-1, the signal reception intensity from the radio base station 110-2 on movement destination becomes larger than the signal reception intensity from the radio base station 110-1 on movement origin. At this time, the radio terminal side handoff control device 127 built in the radio terminal 120-1 determines (S93), as an opportunity of handoff, the time of the reception intensity of the perch channel from the radio base station 110-2 on movement destination becoming larger than the reception intensity of the perch channel from the radio base station 110-1 on movement origin, based on the reception intensity of the perch channel received periodically.

In case of the opportunity of handoff, the radio terminal side handoff control device 127 refers to the latest multicast management table, and determines as to whether or not the multicast data A under reception thereby is distributed into the radio zone Z2 on the radio base station 110-2 on movement destination.

When the multicast data A under reception thereby is not distributed into the radio zone Z2 (NO at S94), the radio terminal side handoff control device 127 transmits a switching request signal for switching the radio base station to be communicated from the radio base station 110-1 on movement origin to the radio base station 110-2 on movement destination to the radio base station on movement destination via the radio link control device 123 (S95). At this time, the radio terminal side handoff control device 127 may transmit the switching request signal directly to the radio base station 110-2 on movement destination, or to the radio base station 110-2 on movement destination via the radio base station 110-1 on movement origin.

As shown in FIG. 24(*b*), the radio base station side handoff control device 116 built in the radio base station 110-2 on movement destination receives the switching request signal from the radio terminal 110-1, and, controls the radio base station side multicast control device 115 on the own station so as to distribute the multicast data A, according to the switching request signal. Under the control, the radio base station side multicast control device 115 starts distribution of the multicast data A (S96). Furthermore, the radio base station side handoff control device 116 transmits a switching response signal to the radio terminal 120-1 which has transmitted the switching request signal, via the radio link control device 112 (S97).

The radio terminal side handoff control device 127 built in the radio terminal 120-1 controls switching of the radio channel according to this switching response signal. Thereby, the radio terminal side handoff control device 127 starts reception of the multicast data A from the radio base station 110-2 on movement destination (S98).

Further, when the multicast data A under reception is distributed into the radio zone Z2 (YES at S94), the radio terminal side handoff control device 127 built in the radio terminal 120-1 controls switching of the radio channel according to the multicast management table. Thereby, the radio terminal side handoff control device 127 starts reception of the multicast data A from the radio base station 110-2 on movement destination (S99).

By the series of operation described above, even when the radio terminal 120-1 moves into the radio zone Z2 on the radio base station 110-2 on movement destination from the radio zone Z1 on the radio base station 110-1 on movement origin, the radio base station to be communicated with can be rapidly switched.

Further, same as in the first embodiment, in S95 of the operation flow shown in FIG. 26, the radio terminal 120-1 may transmit the switching request signal to the radio base station 110-1 on movement origin. Further, the radio terminal 120-1 may transmit the switching request signal to both the radio base station 110-1 on movement origin and the radio base station 110-2 on movement destination.

Further, after the radio terminal 120-1 transmits the switching request signal, when the switching response signal is not able to be received even when a predetermined time has elapsed, the switching request signal may be transmitted again. Further, the radio terminal 120-1 may previously transmits the switching request signal several times. Furthermore, the radio terminal 120-1 may transmit the switching request signal several times, and, when the switching response signal is not able to be received even when a predetermined time has elapsed after the several times of transmission, the switching request signal may transmitted again several times.

Thus, according to this example of operation, in case the radio terminal 120-1 moves across radio zones, information concerning the multicast data which the radio base station 110-2 on movement destination distributes is included in the multicast management table informed of from the radio base station 110-1 on movement origin. Thereby, the radio terminal 120-1 can previously recognize the multicast data which the radio base station 110-2 on movement destination distributes, and it receives the multicast data immediately without transmitting the distribution request, in case the radio base station 110-2 on movement destination distributes the desired multicast data. Accordingly, the radio terminal 120-1 can rapidly switch the radio base station to be communicated with at a time of movement.

Thus, according to the present invention, a radio terminal can determine whether or not to transmit a service continuation request signal to an information distributing apparatus based on informational indicating as to whether continuation request having been made for multicast information distribution service. Moreover, an information distributing apparatus can determine whether or not multicast information distribution service should be continued, based on a management state of service continuation management means. Thereby, the information distributing apparatus can provide multicast information distribution service properly via a radio section to radio terminals present within the service area.

Moreover, according to the present invention, radio channels used for multicast information distribution service can be limited only to radio channels which are informed of by an information distributing apparatus. Further, distribution services made by these radio channels can be limited only to multicast information corresponding to the radio channels informed of. Accordingly, it is possible to utilize the radio resources effectively, and, also, each radio terminal can receive only the necessary multicast information distribution services.

Furthermore, according to the present invention, in case necessity arises for a radio terminal to switch the other party to be communicated, from a radio base station on movement origin to a radio base station on movement destination, information of a radio channel used for distributing multicast data is transmitted from the radio base station on movement destination to the radio terminal, only as a result of the radio terminal transmitting a distribution request to the radio base station on movement destination. Thereby, it is possible to rapidly switch the radio base station to be communicated with at a time of movement, more rapidly than the prior art.

The invention claimed is:

1. A multicast service providing system of performing multicast information distribution service to a radio terminal present within a service area via a radio section from an information distributing apparatus, wherein:

said radio terminal has service continuation requesting means transmitting to said information distributing apparatus a service continuation request signal for requesting continuation of multicast information distribution service;

said information distributing apparatus has service continuation management means managing as to whether or not the above-mentioned request for service continuation from the radio terminal for the multicast information distribution service has been made; and said information distributing apparatus transmits to said radio terminal information managed by the service continuation management means has been made indicating whether or not the continuation request for the multicast information distribution service has been made.

2. The multicast service providing system as claimed in claim 1, wherein:

said service continuation management means manages as to whether or not continuation request has been made for the multicast information distribution service by using a flag which is made to be ON when the service continuation request signal is received from the radio terminal.

3. The multicast service providing system as claimed in claim 1, wherein:

said service management means has management state resetting means resetting a management state thereof into a state that no request for continuation of service for the multicast information distribution service from the radio terminal has been made.

4. The multicast service providing system as claimed in claim 3, wherein:

said management state resetting means performs a resetting operation for the management state every predetermined period.

5. The multicast service providing system as claimed in claim 3, wherein:

said radio terminal has continuation request control means performing a control such that, when the information indicating whether or not continuation request for the multicast information distribution service has been made transmitted from the information distribution apparatus indicates a state that the request has not been made, the service continuation requesting means transmits the service continuation request signal to the information distributing apparatus.

6. The multicast service providing system as claimed in claim 5, wherein:

said continuation request control means controls said service continuation requesting means so that the service continuation request signal is transmitted after a first random time has elapsed since the information indicating the state that no continuation request has been made for the multicast information distribution service was received from said information distributing apparatus.

7. The multicast service providing system as claimed in claim 5, wherein:

said radio terminal has re-transmission control means performing a control such that said service continuation requesting means re-transmits the service continuation request signal to said information distributing apparatus when the information indicating as to whether or not continuation request has been made for the multicast information distribution service has not been changed into information indicating that the request has been made within a predetermined time after the service continuation requesting means transmitted the service continuation request signal.

8. The multicast service providing system as claimed in claim 7, wherein:
said re-transmission control means controls said service continuation requesting means so that the service continuation request signal is transmitted again after a second random time has elapsed after the predetermined time had elapsed since said service continuation requesting means transmitted the service continuation request signal.

9. The multicast service providing system as claimed in claim 7, wherein:
a setting is made such that a time taken since the above-mentioned management state resetting means reset the management state of the service request management means into a state that no request for continuation of service for the multicast information distribution service has been made until the above-mentioned service continuation request means
re-transmits the service continuation request signal be shorter than a time taken since the above-mentioned management state was reset to the state that continuation for a service has not been made from the radio terminal for the multicast information distribution service until the resetting is made subsequently.

10. A multicast service providing method, wherein:
when an information distributing apparatus performs multicast information distribution service to a radio terminal present within a service area via a radio section,
said information distributing apparatus manages as to whether or not request for service continuation from the radio terminal for the multicast information distribution service has been made, and, also,
transmits thus-managed information indicating whether or not the continuation request for the multicast information distribution service management has been made to the radio terminals, and
said radio terminal transmits a service continuation request signal to said information distributing apparatus when the information transmitted from the information distributing apparatus indicating whether or not service continuation request has been made by said radio terminal for the multicast information distribution service indicates a state that the request has not been made.

11. The multicast service providing method as claimed in claim 10, wherein:
the management state as to whether or not continuation request has been made for the multicast information distribution service from the radio terminal is reset to a state that no continuation request for the multicast information distribution service has been made from the radio terminal, periodically.

12. The multicast service providing method as claimed in claim 10, wherein:
when the information indicating whether or not continuation request has been made for the multicast information distribution service is not changed into a state that the request has been made within a predetermined time after the radio terminal transmitted the service continuation request signal, the service continuation request signal is transmitted to the information distributing apparatus again.

13. An information distributing apparatus which performs multicast information distribution service via a radio section to a radio terminal present within a service area, comprising:
service continuation management means managing as to whether or not service continuation request has been made by the radio terminal for the multicast information distribution service,
information managed by said service continuation management means indicating as to whether or not continuation request for the multicast information distribution service being transmitted to the radio terminal.

14. The information distributing apparatus as claimed in claim 13, wherein:
the service continuation management means has management state resetting means resetting the management state into a state that no service continuation request has been made by the radio terminal for the multicast information distribution service.

15. The information distributing apparatus as claimed in claim 14, wherein:
said management state resetting means performs the resetting operation every predetermined period.

16. A radio terminal which receives multicast information distribution service from an information distributing apparatus via a radio section, comprising:
service continuation request means transmitting a service continuation request signal for requesting provision of the multicast information distribution service, to the information distributing apparatus; and
continuation request control means controlling said service continuation request means so as to cause it to transmit the service continuation request signal to the information distributing apparatus when information indicating whether or not service continuation request has been made by the radio terminal for the multicast information distribution service, transmitted by the information distributing apparatus which manages as to whether or not the service continuation request has been made by the radio terminal for the multicast information distribution service, indicates a state that the request has not been made.

17. The radio terminal as claimed in claim 16, comprising re-transmission control means controlling the service continuation request means so that the service continuation request means re-transmits the service continuation request signal to the information distributing apparatus, when the information indicating whether or not service continuation request has been made by the radio terminal for the multicast information distribution service has not been changed into a state that the request has been made within a predetermined time after the service continuation request means transmitted the service continuation request signal.

18. A multicast service providing method by which multicast information distribution service is performed by an information distributing apparatus via a radio section on radio terminals present in a service area thereof:
wherein:
the information distributing apparatus informs all the radio terminals present in the service area of information for identifying multicast information on distribution and radio channels including at least one frequency number used for the distribution of the multicast information by using a single message sent on a predetermined radio channel, and
the respective radio terminals within the service area receive the multicast information distribution service from the information distributing apparatus via the thus- informed radio channels.

19. The multicast service providing method as claimed in claim 18, wherein:
the information distributing apparatus manages correspondence relationship between the information for identifying the multicast information on distribution service and the radio channels used for distributing the multicast information, and
informs all the radio terminals present within the service area management information indicating the correspondence relationship by using the above-mentioned predetermined radio channel, and
each of the radio terminals present within the service area receives the desired multicast information distribution service by using the corresponding radio channels based on the management information.

20. The multicast service providing method as claimed in claim 19, wherein:
the radio terminal transmits a service request signal for requesting distribution service of multicast information not included in the management information, to the information distributing apparatus;
when receiving said service request signal from the radio terminal, the information distributing apparatus adds to the management information a correspondence relationship between information identifying the multicast information concerning said request and a radio channel used for distributing the multicast information; and, also
starts distribution service of the multicast information concerning said request by using said radio channel.

21. The multicast service providing method as claimed in claim 18, wherein:
the information distributing apparatus informs a continuation check signal for inquiring a necessity of continuation of the multicast information distribution service, to all the radio terminals present in the service area;
when receiving the continuation check signal from the information distributing apparatus, the radio terminal transmits a predetermined response signal to the information distributing apparatus for continuously receiving the multicast information distribution service; and
when receiving the predetermined response signal after transmitting the continuation check signal, the information distributing apparatus continues distributing service of the multicast information concerning the inquiry.

22. The multicast service providing method as claimed in claim 21, wherein:
in case the response signal has not been received from any of the radio terminals in response to the continuation check signal within a predetermined time, the information
distributing apparatus terminates distribution service of the multicast information concerning the inquiry.

23. The multicast service providing method as claimed in claim 21,
said information distributing apparatus manages correspondence relationship between information identifying the multicast information on distribution service and radio channels used for distributing the multicast information, and transmits management information indicating the correspondence relationship to all the radio terminals present within the service area; and
a correspondence relationship between multicast information for which distribution service is terminated and a radio channel used for distributing the multicast information is deleted from the management information.

24. The multicast service providing method as claimed in claim 21, wherein:
said information distributing apparatus manages correspondence relationship between information for identifying multicast information on distribution service and radio channels used for distributing the multicast information, and informs management information indicating the correspondence relationship to all the radio terminals present within the service area by using the predetermined channel; and
deletes a correspondence relationship between information for identifying multicast information for which distribution service is terminated and a radio channel used for distributing the multicast information from the management information.

25. The multicast service providing method as claimed in claim 21, wherein:
the radio terminal transmits a reception termination signal to the information distributing apparatus for terminating distribution service of multicast information; and
when receiving the reception termination signal from the radio terminal, the information distributing apparatus informs a continuation check signal for inquiring a necessity of continuation of the multicast information distribution service concerning the distribution service reception termination to all the radio terminals present within the service area.

26. A multicast service providing system in which multicast information distribution service is made by an information distributing apparatus to radio terminals present within a service area via a radio section, wherein:
the information distributing apparatus has information control means informing, by using a single message sent on a predetermined radio channel, all the radio terminals present within the service area, of information for identifying multicast information on distribution service and radio channels including at least one frequency number used for distributing the multicast information; and
each radio terminal present within the service area receives the multicast information distribution service from the information distributing apparatus by using the radio channels thus informed of.

27. The multicast service providing system as claimed in claim 26, wherein:
the information distributing apparatus has management means managing correspondence relationship between the information identifying the multicast information on distribution service and the radio channels used for distributing the multicast information, and
informs, of management information indicating the correspondence relationship, all the radio terminals present within the service area by using a predetermined radio channel; and
each radio terminal present within the service area receives the desired multicast information distribution service from the information distributing apparatus via the corresponding radio channels based on the management information.

28. The multicast service providing system as claimed in claim 27, wherein:
the radio terminal has service requesting means transmitting a service request signal for requesting distribution service for multicast information not included in the management information;
the information distributing apparatus has first management information updating means adding, when receiving said service request signal from the radio terminal, to the management information, a correspondence relationship between information for identifying the multicast information concerning the request and a radio channel used for distributing the multicast information, and as well as updates the management information by the first management information updating means, starts distribution service of the multicast information concerning the request by using said radio channel.

29. The multicast service providing system as claimed in claim 26, wherein:

the information distributing apparatus has service continuation check means informing all the radio terminals present within the service area of a continuation check signal for inquiring a necessity of continuation of the multicast information distribution service;

the radio terminal has response signal transmission control means transmitting, when receiving the continuation check signal from the information distributing apparatus, a predetermined response signal for continuously receiving the multicast information distribution service; and, further the information distributing apparatus has service continuation control means continuing, when receiving the predetermined response signal from the service continuation check means after transmitting the service continuation check signal, the multicast information distribution service concerning the inquiry.

30. The multicast service providing system as claimed in claim 29, wherein:

the information distributing apparatus has service termination control means terminating, when the response signal has not been received from any of the radio terminals within a predetermined time in response to the continuation check signal, the multicast information distribution service concerning the inquiry.

31. The multicast service providing system as claimed in claim 29, wherein:

said service continuation check means informs all the radio terminals present within the service area of the continuation check signal as well as information for identifying the multicast information on distribution service and radio channels used for distributing the multicast information by using the predetermined radio channel.

32. The multicast service providing system as claimed in claim 29, wherein:

said information distributing apparatus manages correspondence relationship between information identifying multicast information on distribution service and radio channels used for distributing the multicast information, and informs all the radio terminals present within the service area management information indicating the correspondence relationship by using the predetermined radio channel; and said information distributing apparatus has second management information updating means deleting a correspondence relationship between information identifying multicast information for which distribution service is terminated and a radio channel used for distributing the multicast information, from the management information.

33. The multicast service providing system as claimed in claim 29, wherein:

the radio terminal has termination control means transmitting, when terminating reception of a multicast information distribution service, a reception termination signal to the information distributing apparatus; and when receiving the reception termination signal from the radio terminal, the service continuation check means of the information distributing apparatus transmits a continuation check signal for inquiring a necessity of continuation of the multicast information distribution service concerning the distribution service reception termination to all the radio terminals present within the service area.

34. An information distributing apparatus performing multicast information distribution service for radio terminals present within a service area via a radio section, comprising:

informing control means for informing all the radio terminals present within the service area of information for identifying multicast information on distribution service and radio channels including at least one frequency number used for distributing the multicast information by using a single message sent on a predetermined radio channel, each of the radio terminals present within the service area being able to receive the multicast information distribution service via the thus-informed radio channels.

35. The information distributing apparatus as claimed in claim 34, comprising:

management means managing correspondence relationship between multicast information on distribution service and radio channels used for distributing the multicast information, said informing control means informing all the radio terminals present within the service area of management information indicating the correspondence relationship managed by said management means, by using the predetermined radio channel.

36. The information distributing apparatus as claimed in claim 35, wherein:

said management means comprises first management information updating means adding, when receiving a service request signal concerning multicast information for which distribution service has not been made from the radio terminal, a correspondence relationship between information identifying the multicast information concerning the request managed by said management means and a radio channel used for distributing the multicast information, to the management information, as well as the management information being updated by said first management information updating means, distribution service of the multicast information concerning the request being started by using said radio channel.

37. The information distributing apparatus as claimed in claim 34, comprising:

service continuation check means informing all the radio terminals present within the service area of a continuation check signal for inquiring a necessity of continuation of the multicast information distribution service; and service continuation control means continuing, when receiving a predetermined response signal after transmitting the service continuation check signal by said service continuation check means, the multicast information distribution service concerning the inquiry.

38. The information distributing apparatus as claimed in claim 37, comprising:

service termination control means terminating, when a response signal has not been received from any one of the radio terminals within a predetermined time in response to the continuation check signal by said service continuation check means, the multicast information distribution service concerning the inquiry.

39. The information distributing apparatus as claimed in claim 37, wherein:

said service continuation check means informs all the radio terminals present within the service area of the continuation check signal as well as information for identifying the multicast information on distribution service and radio channels used for distributing the multicast information by using the predetermined radio channel.

40. The information distributing apparatus as claimed in claim 37, comprising:

said management means managing correspondence relationship between information identifying multicast information on distribution service and radio channels used for distributing the multicast information, and informing all the radio terminals present within the service area management information managed by said management means indicating the correspondence relationship by using the predetermined radio channel; and second management information updating means deleting a correspondence relationship between information identifying multicast information for which distribution service is terminated and a radio channel used for distributing the multicast information, from the management information.

41. The distributing apparatus as claimed in claim 37, wherein:

when receiving, from the radio terminal receiving multicast information distribution service, a reception termination signal indicating termination of the reception of distribution service, said service continuation check means transmits a continuation check signal for inquiring a necessity of continuation of the multicast information distribution service concerning the distribution service reception termination to all the radio terminals present within the service area.

42. A radio terminal which receives multicast information distribution service via a radio section from an information distributing apparatus, comprising:

service state reception control means receiving a single message from the information distributing apparatus management information indicating correspondence relationship between information for identifying multicast information on distribution service and radio channels including at least one frequency number used for distributing the multicast information, and receiving from the information distributing apparatus the desired multicast information distribution service via the corresponding radio channels based on the management information received by the service state reception control means in the single message.

43. The radio terminal as claimed in claim 42, comprising:

service requesting means transmitting a service request signal for requesting a distribution service for multicast information not included in the management information to the information distributing apparatus, such that the information distributing apparatus may add, when receiving said service request signal from the radio terminal, to the management information, a correspondence relationship between information for identifying the multicast information concerning the request and a radio channel used for distributing the multicast information, and, also, distribution service of the multicast information concerning the request may be started by using said radio channel.

44. The radio terminal as claimed in claim 42, comprising:

response signal transmission control means transmitting, when receiving a continuation check signal for inquiring a necessity of continuation of multicast information distribution service from the information distributing apparatus, a predetermined response signal for continuously receiving the multicast information distribution service.

45. The radio terminal as claimed in claim 44, comprising:

termination control means transmitting a reception termination signal to the information distributing apparatus for terminating reception of multicast information distribution service, such that said information distributing apparatus may inform, when receiving the reception termination signal from the radio terminal, all the radio terminals present within the service area of a continuation check signal for inquiring a necessity of continuation of the multicast information distribution service concerning the distribution service reception termination.

46. A multicast service providing method by which multicast data is distributed to radio terminals from a radio base station, wherein:

the radio terminal which receives the multicast data transmits a distribution request for multicast data to a radio base station on movement destination in case a necessity arises such that the other party of communication be switched from a radio base station on movement origin to the radio base station on movement destination, the radio base station on movement destination transmits information of a radio channel used for distributing the multicast data to the radio terminal in response to the distribution request given therefrom, and the radio terminal switches the radio channel based on the information of the radio channel given by the radio base station on movement destination and receives the multicast data from the radio base station on movement destination.

47. The multicast service providing method as claimed in claim 46, wherein:

the radio terminal transmits the distribution request for the multicast data to the radio base station on movement origin, and the distribution request for the multicast data is transmitted to the radio base station on movement destination via the radio base station on movement origin.

48. The multicast service providing method as claimed in claim 46, wherein:

in case the radio terminal cannot receive information of the radio channel to be used for distributing the multicast data within a predetermined time after transmitting the distribution request, the radio terminal transmits the distributing request again.

49. The multicast service providing method as claimed in claim 46, wherein:

the radio terminal transmits the distribution request several times.

50. The multicast service providing method as claimed in claim 46, wherein:
- the radio base station on movement origin obtains information concerning multicast data distributed by an adjacent radio base station, and transmits the information concerning the multicast data, and
- in case the radio terminal determines that the radio base station on movement destination does not distribute the desired multicast data based on the information concerning the multicast data given by the radio base station on movement origin, the radio terminal transmits the distribution request to the radio base station on movement destination or the radio base station on movement origin so that the distribution request may be received by the radio base station on movement destination.

51. A radio base station which transmits multicast data to a radio terminal, comprising:
- distribution request receiving means receiving a distribution request for multicast data transmitted from the radio terminal, and
- radio channel information transmitting means transmitting information of a plurality of radio channels including at least one frequency number used for distributing the multicast data in a single message in response to the distributing request for the multicast data given by the radio terminal.

52. The radio base station as claimed in claim 51, wherein:
- the distribution request receiving means receives the distribution request for multicast data transmitted from the radio terminal via another radio base station.

53. The radio base station as claimed in claim 51, wherein:
- the distribution request receiving means comprises information obtaining means obtaining information concerning multicast data transmitted from a radio base station adjacent thereto, and
- multicast information transmitting means transmitting the information concerning the multicast information.

54. A radio terminal which receives multicast data distributed by a radio base station, comprising:
- distribution request transmitting means transmitting a distribution request for multicast data to a radio base station on movement destination in case a necessity arises such that the other party of communication be switched from a radio base station on movement origin to the radio base station on movement destination, and
- multicast data reception control means for switching a radio channel based on information concerning a radio channel used for distributing the multicast data transmitted from the radio base station on movement destination in response to the distribution request so as to receive the multicast data distributed from the radio base station on movement destination.

55. The radio terminal as claimed in claim 54, wherein:
- the distribution request transmitting means transmits the distribution request for the multicast data to the radio base station on movement origin so that the distribution request for the multicast data is transmitted to the radio base station on movement destination via the radio base station on movement origin.

56. The radio terminal as claimed in claim 54, wherein:
- the request transmitting means transmits the distribution request again in case information concerning the radio channel to be used for distributing the multicast data cannot be received within a predetermined time after transmitting the distributing request.

57. The radio terminal as claimed in claim 54, wherein:
- the distribution request transmitting means transmits the distribution request several times.

58. The radio terminal as claimed in claim 54, wherein:
- the distribution request transmitting means transmits the distribution request to the radio base station on movement destination or the radio base station on destination origin so that the distribution request for the multicast data be received by the radio base station on movement destination in case the distribution request transmitting means determines that the radio base station on movement destination does not distribute the desired multicast data based on information, received from the radio base station on movement origin, concerning multicast information distributed from the radio base station adjacent to the station.

* * * * *